United States Patent [19]
Stich et al.

[11] Patent Number: 6,027,128
[45] Date of Patent: Feb. 22, 2000

[54] MULTI-PURPOSE DOLLY-TRUCK

[75] Inventors: Richard G. Stich, Santa Barbara; Mathew C. Pratton, Galt; Jesus J. Peña, Yorba Linda, all of Calif.

[73] Assignee: Premier Drywall Tool Co., Stockton, Calif.

[21] Appl. No.: 08/763,525

[22] Filed: Dec. 12, 1996

Related U.S. Application Data

[63] Continuation-in-part of application No. 08/277,469, Jul. 20, 1994, abandoned.

[51] Int. Cl.[7] .................................................. B62B 3/10
[52] U.S. Cl. ................................. 280/47.16; 280/47.18; 280/47.2; 280/47.26; 280/47.35; 280/79.2; 280/79.5
[58] Field of Search ........................ 280/47.2, 47.18, 280/47.16, 79.5, 47.11, 47.131, 47.17, 47.23, 47.24, 47.25, 47.26, 47.27, 47.315, 47.35, 47.371, 47.41, 79.11, 79.2, 79.3, 655.1, 655; 220/506, 571, 737, 908, DIG. 5

[56] References Cited

U.S. PATENT DOCUMENTS

| | | |
|---|---|---|
| D. 269,216 | 5/1983 | Greenheck . |
| D. 276,948 | 12/1984 | Wacek et al. . |
| D. 309,811 | 8/1990 | Terrizzi . |
| 1,328,458 | 1/1920 | Schiek et al. . |
| 2,321,981 | 6/1943 | Bowers . |
| 2,424,644 | 7/1947 | Barrett . |
| 2,531,131 | 11/1950 | Johnson . |
| 2,582,435 | 1/1952 | Howard . |
| 2,665,922 | 1/1954 | Bard et al. . |
| 2,707,351 | 5/1955 | Walker . |
| 2,711,906 | 6/1955 | Rideout et al. . |
| 2,920,902 | 1/1960 | Scott . |
| 2,947,548 | 8/1960 | Bard . |
| 3,528,676 | 9/1970 | Marcandalli . |
| 3,734,527 | 5/1973 | Bard . |
| 4,435,115 | 3/1984 | Orstad et al. . |
| 4,650,200 | 3/1987 | Berfield et al. . |
| 4,846,485 | 7/1989 | Payne . |
| 4,950,003 | 8/1990 | Holtz . |
| 5,088,751 | 2/1992 | Zint . |
| 5,143,389 | 9/1992 | Jonkers . |
| 5,183,280 | 2/1993 | Gresch . |
| 5,244,221 | 9/1993 | Ward . |
| 5,433,463 | 7/1995 | Finley . |
| 5,472,220 | 12/1995 | Stephan . |

FOREIGN PATENT DOCUMENTS

| | | |
|---|---|---|
| 302-842 | 2/1989 | European Pat. Off. . |
| 344945 | 3/1931 | United Kingdom . |
| 1602-436 | 11/1981 | United Kingdom . |

*Primary Examiner*—Anne Marie Boehler
*Attorney, Agent, or Firm*—Skjerven, Morrill, MacPherson, Franklin & Friel LLP; Alan H. MacPherson; Omkar K. Suryadevara

[57] ABSTRACT

A multi-purpose, movable apparatus (henceforth dolly-truck) for conveying objects, such as, for example, a five-gallon cylindrical industrial bucket is described. The dolly-truck includes a one-piece, molded plastic base having caster wheels and truck wheels. The caster wheels are mounted on a lower surface of the base and provide short distance rolling movement capability in the upright position. Connected to the base are two truck support arms which support an axle with two truck wheels. The truck wheels provide a hand truck capability for negotiating stairs, bypassing obstacles and an omnidirectional capability in conveyance of objects. Centered on the base is a retaining wall for receiving and holding objects. Connected to, and integrated into the retaining wall is an adjustable handle for conveying the dolly-truck by hand. The handle can be used to move the dolly-truck on the caster wheels as a conventional dolly, or alternatively on the truck wheels as a conventional hand truck. The base of the dolly-truck is surrounded by an optional ring which allows the dolly-truck to be conveyed by foot. An annular surface of the base outside the retaining wall and inside the ring forms a spill surface that prevents spillage of liquid from an open bucket onto the floor.

70 Claims, 19 Drawing Sheets

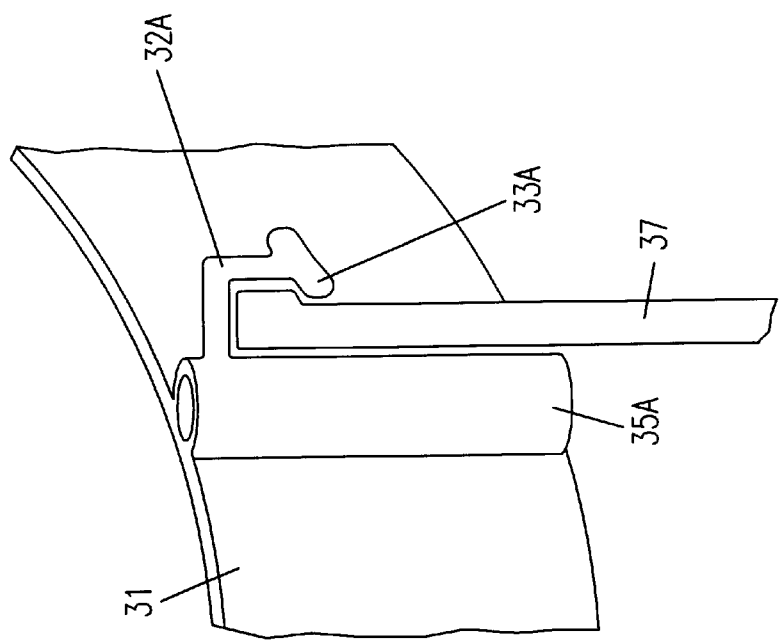
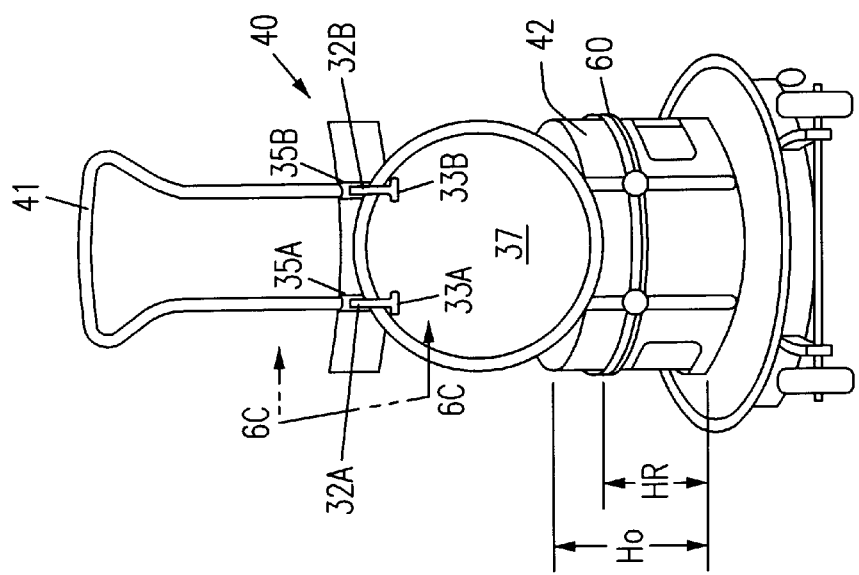
FIG. 6C
FIG. 6B

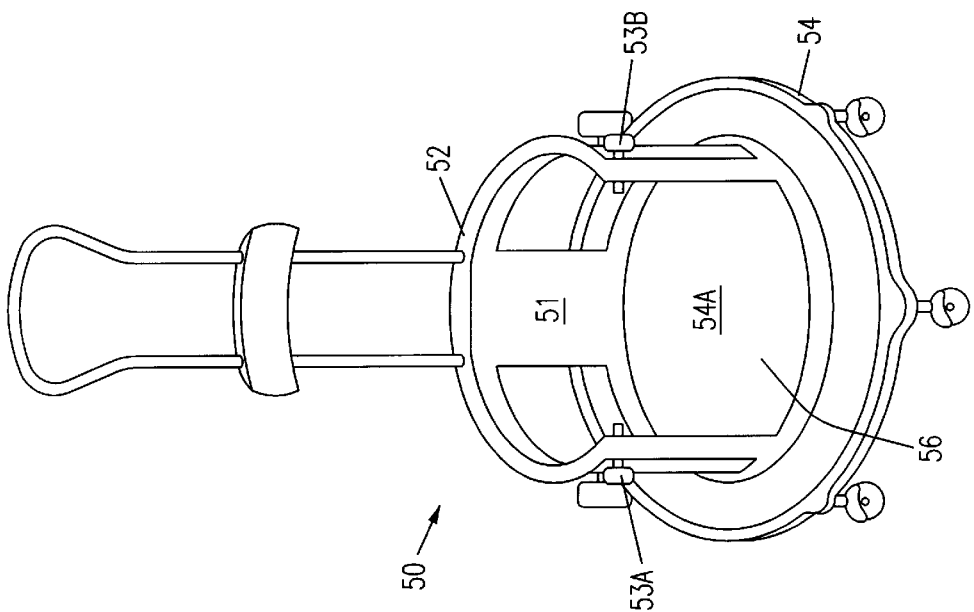
FIG. 7A
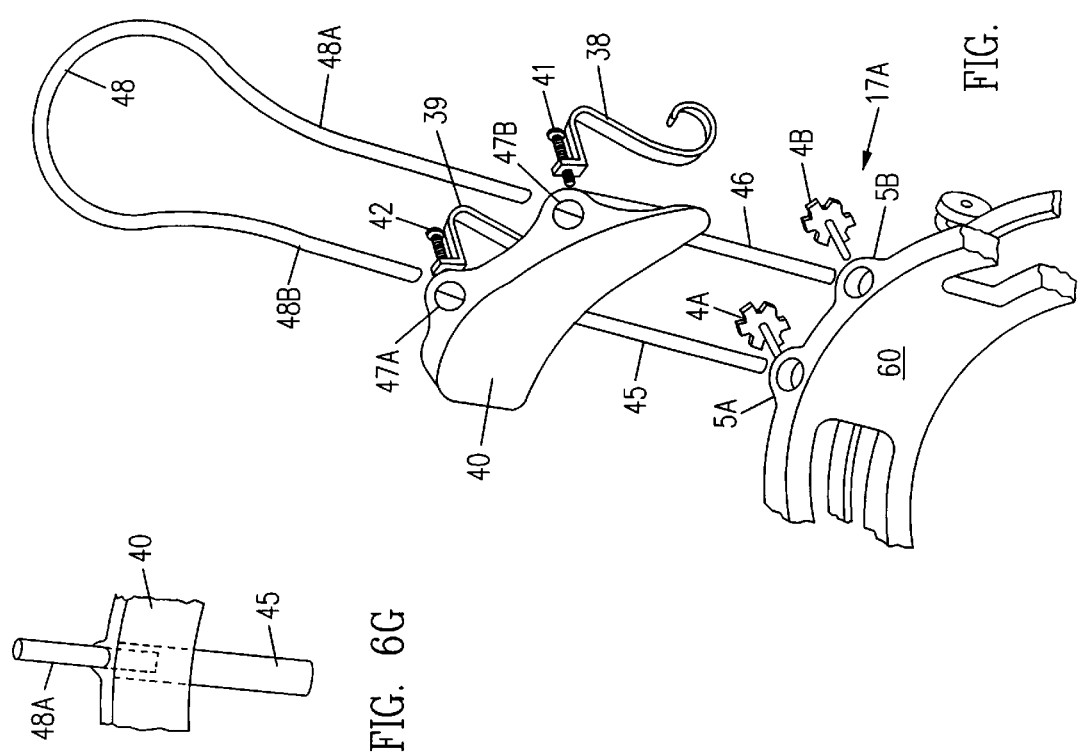
FIG. 6F
FIG. 6G

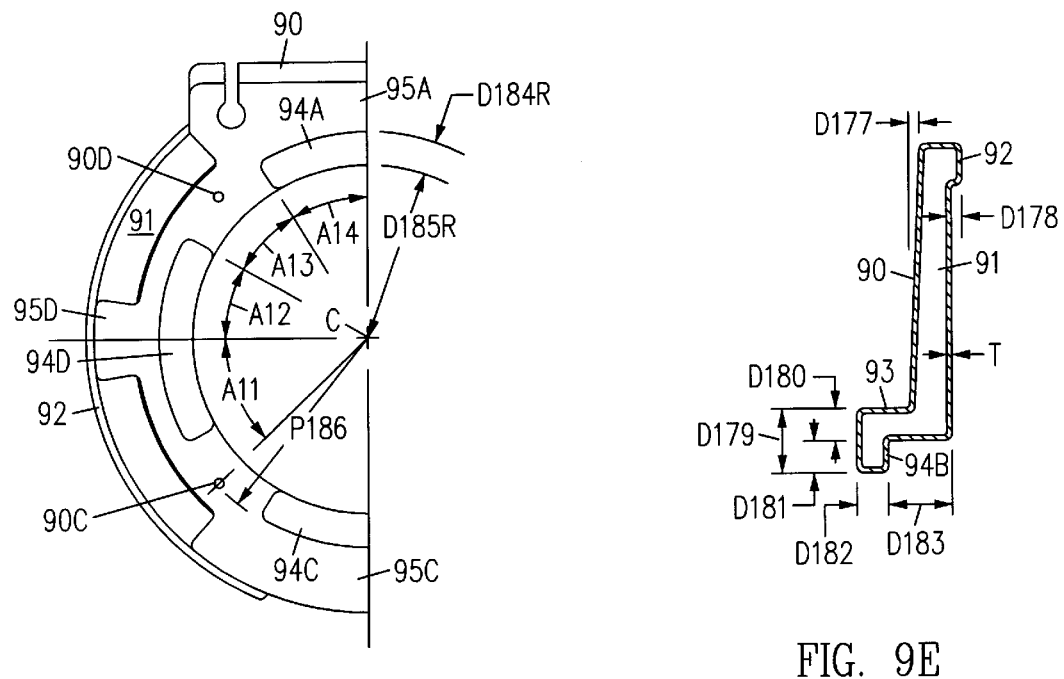
FIG. 9C
FIG. 9E
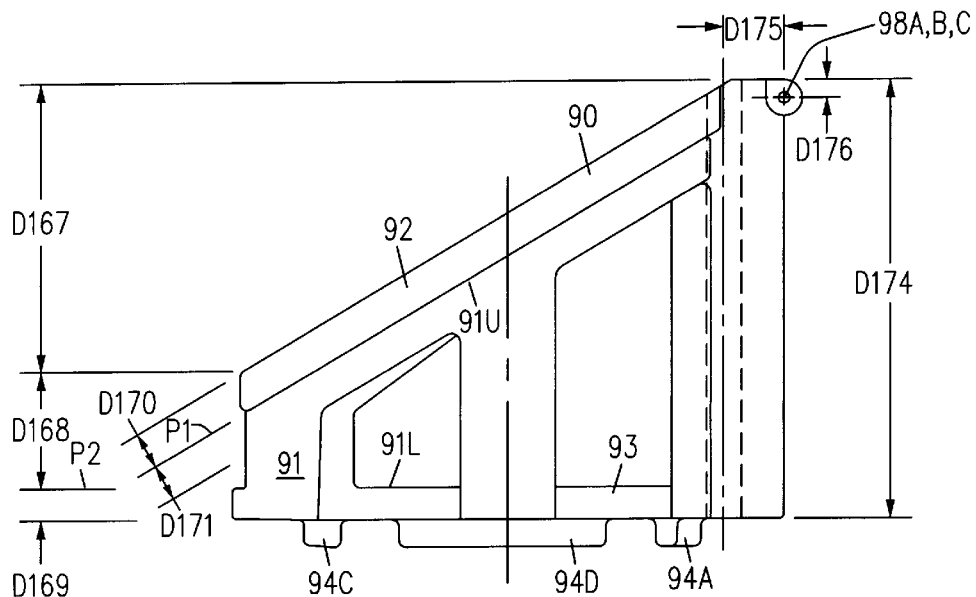
FIG. 9D

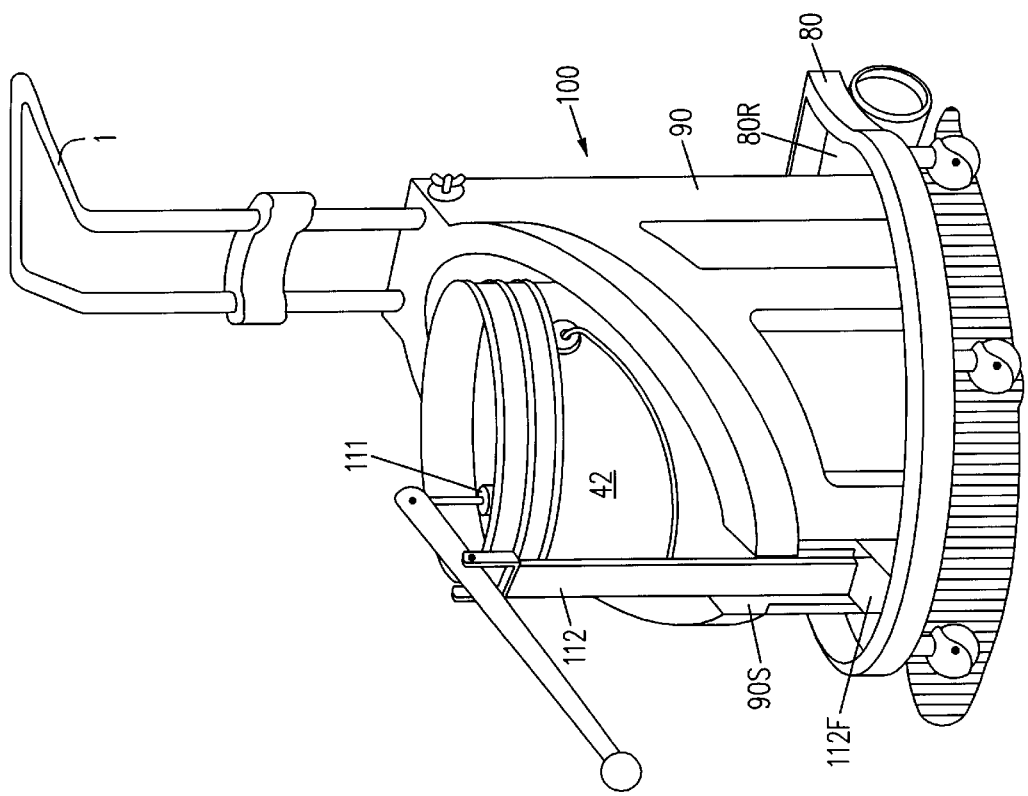
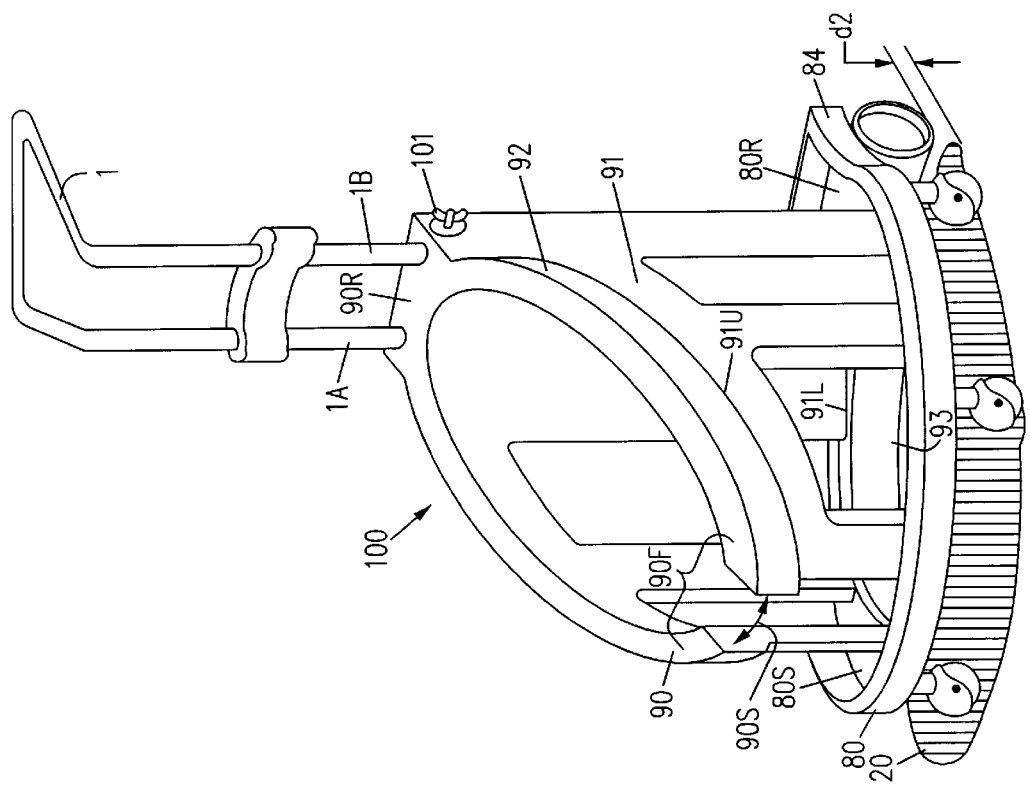
FIG. 10A
FIG. 10B

MULTI-PURPOSE DOLLY-TRUCK

This application is a continuation-in-part application of the U.S. patent application Ser. No. 08/277,469 entitled "Multi-Purpose Dolly-Truck" by Richard G. Stich, filed Jul. 20, 1994, now abandoned that is incorporated by reference herein in its entirety.

FIELD OF THE INVENTION

This invention generally relates to an apparatus and method for conveying objects and in particular to an apparatus and method for conveying a bucket of, for example, liquid for short distances with rolling motion of a dolly and over small obstacles with tilting motion of a truck.

BACKGROUND OF THE INVENTION

Buckets of various sorts are utilized for numerous activities and can have a bail type handle. Some common uses of such buckets are for holding paint, dry wall joint compound, chemicals, food, plastics, asphalt, tar, farm feed, and cleaning fluids. When buckets are emptied of material, they are commonly used for holding water, other liquids, tools, nails, screws and other small parts. Such buckets are commonly carried by hand, sometimes physically straining the neck, shoulders, forearms, back, and/or wrists, of the persons carrying the buckets.

To transport such buckets, dollies with caster wheels are used in the prior art. A caster wheel is a wheel mounted to permit the wheel to swivel freely. Caster wheels permit short distance rolling movements of a dolly. Using a dolly, a bucket can be moved on a floor without lifting or tipping the dolly.

One disadvantage of prior art dollies is that a dolly can convey an open bucket only on a smooth floor. Any drag or any obstacle such as extension cords, stairs and sudden floor elevation changes will stop the dolly's motion and can spill a liquid contained in the bucket being carried by the dolly. Moreover, a dolly's front wheels cannot be raised to, for instance, go over an extension cord. Going up or down stairs with a dolly is also difficult because the swiveling nature of caster wheels frequently results in one wheel facing the stairs while another wheel is in a different position, which can, in turn, result in dragging. To negotiate such obstacles, the dolly and bucket both have to be carried over the obstacle.

Also in the prior art, hand trucks are used to transport buckets. A typical prior art hand truck has a handle and a pair of non-swiveling, parallel truck wheels on which the hand truck can be pivoted. Using a hand truck, a sealed bucket can be lifted from its upright position and moved in a tilted position and over obstacles such as extension cords and stairs.

Although a hand truck can negotiate obstacles, a hand truck cannot easily be rolled along a floor (in an upright position) as necessary for short distance movements in cases where work commonly starts and stops (such as, for example, painting hallways, maintaining hardware, moving containers around a kitchen, cleaning with mops in the bucket, vacuuming a floor and dispensing liquid on a driveway). Moreover, a hand truck cannot convey open containers of liquid because the liquid can spill when a hand truck is tilted. Liquid sloshed out of an open bucket can land on the floor and be conveyed by the wheels or cause the floor to be slippery and thus dangerous.

SUMMARY OF INVENTION

In accordance with this invention, a single apparatus called a "dolly-truck" is provided which has caster wheels for short distance rolling movement of an object in an upright position as well as truck wheels for moving the object in a tilted position over obstacles such as stairs. Thus, the dolly-truck has the versatility to be used as a dolly and can be tilted back to be used as a hand truck. The dolly-truck provides a very stable mechanical structure for moving objects such as open or closed buckets, various kinds of barrel containers, and five-gallon open containers.

The dolly-truck of this invention has a body with caster wheels mounted at a sufficient distance from the body center to provide stability to the dolly-truck. In one embodiment of this invention, the dolly-truck body includes a retaining structure (such as a wall, called "retaining wall") to hold the object being transported in place during movement of the dolly-truck. The retaining structure has a height of at least one half the height of the object thereby to retain the object during movement of the dolly-truck.

In a variation of this embodiment, a retaining wall of the dolly-truck has holes so that labels on the object are visible. In another variation of this embodiment, the retaining wall includes a retaining ring typically but not necessarily at the top of the retaining wall with knobs (called "retaining knobs") which permit the object to be securely fastened to the dolly-truck. The retaining wall and the ring have closed circular shapes in one embodiment and open shapes in another embodiment. The open shapes allow an object to be moved through the opening, thereby eliminating the need to lift the object over the retaining structure during e.g. removal of the object from the retaining structure. The open shapes can form half a circle (i.e., semicircle) or a larger portion of a circle than the semicircle. In one variant, the retaining structure substantially encircles the object except for a slot that accommodates a pump mounted on the object. In still another variant, the retaining structure has a varying height, wherein a portion (called "front portion") having the smallest height also eliminates the need to lift the object over another portion (called "rear portion") having the largest height of the retaining structure. A retaining ring is openable in one embodiment with a portion, called "closure member", that can move (e.g. slide or pivot) with respect to the retaining wall, as described below.

The dolly-truck preferably has a handle which is adjustably attached to the dolly-truck body. In one specific embodiment, the handle is frictionally supported in extension tubes of the retaining wall. The handle can be raised or lowered, depending on the height of the user. Depending on the embodiment, adjustment knobs or a wing nut when tightened, prevent the handle from moving either up or down in the extension tubes while the dolly-truck is being utilized. The handle is used by a user to roll the dolly-truck in an upright position along a floor and also to move the dolly-truck in a tilted position over obstacles.

The handle has a brace for stability. In one embodiment, the brace has a concave cylindrical surface which permits two or more buckets (either filled or empty) to be stacked one on top of the other and be simultaneously moved by a single dolly-truck. In one variant of this embodiment, the brace has one or more clips that can hold two objects (e.g. a basket of tools and a lid) simultaneously, thereby reducing the cost (as compared to using two types of clips to hold the two objects). If the handle interferes with any given process, the handle can be detached from the retaining wall, and the retaining ring can be used to lift and carry the dolly-truck with its load when necessary.

In another embodiment, the dolly-truck has a ring, (called "kick ring"), which permits short distance rolling movement in the upright position by a user pushing on the kick ring with the user's foot. The kick ring frees the user's hands while the dolly-truck is propelled by foot. In one embodiment, a surface of the dolly-truck body (called "spill surface") is located between the kick ring and the retaining wall, and holds any liquid or other contents spilled out from the object during movement (in either the upright or tilted position) of the dolly-truck. The spill surface can also be used to carry tools. In another embodiment the dolly-truck has a shelf for holding additional tools that are supported by the spill surface.

In one embodiment, the dolly-truck caster wheels are shielded ball caster wheels which carry load easily on flat, smooth, and carpeted surfaces. The shielded ball caster wheels also prevent spilled liquid from being conveyed or tracked by the wheels. In this embodiment, the body of the dolly-truck is formed from one piece of molded, high-strength plastic. In two variants of this embodiment, the body is injection molded and rotational molded. Moreover, depending on the embodiment, the body is either solid or hollow. The parts of the dolly truck which hold the handle, the truck wheels and the caster wheels are also molded into the body.

To assemble one embodiment of the dolly-truck, the axle and the truck wheels are attached and the caster wheels are popped into molded holes in the bottom of the unit. The handle is placed into the extension tubes and the adjustment knobs are tightened to secure the handle to the body. In alternative embodiments, the dolly-truck is made of fiberglass, steel tubing and/or formed of aluminum, and retains one or more of the features discussed above.

BRIEF DESCRIPTION OF THE DRAWINGS

FIGS. 6A, 6B and 6C illustrate, in a perspective view, a rear elevation view, and an enlarged view respectively a dolly-truck handle brace having lid clips (FIG. 6A) for holding the lid (FIGS. 6B and 6C) of a bucket.

FIG. 6F illustrates assembly of the clips of FIGS. 6D–6F and the handle to form a dolly-truck.

FIG. 6G illustrates, in an enlarged view, the insertion of an arm 48A of handle 48 into extension tube 45 during the assembly of the dolly-truck of FIG. 6F.

FIGS. 7A, 7B and 7C illustrate, in perspective view, another embodiment of a dolly-truck having a retaining structure formed by an open semicircular retaining wall and an open semicircular retaining ring.

FIGS. 9A–9E illustrate a retaining structure also formed by rotational molding for use with the base of FIGS. 8A–8G.

FIG. 10A illustrates a dolly-truck formed by attaching the retaining structure of FIGS. 9A–9E to the base of FIGS. 8A–8G.

FIG. 10B illustrates use of the dolly-truck of FIG. 10A to carry the prior art bucket and pump of FIGS. 1A–1B.

DETAILED DESCRIPTION

Figure 1:
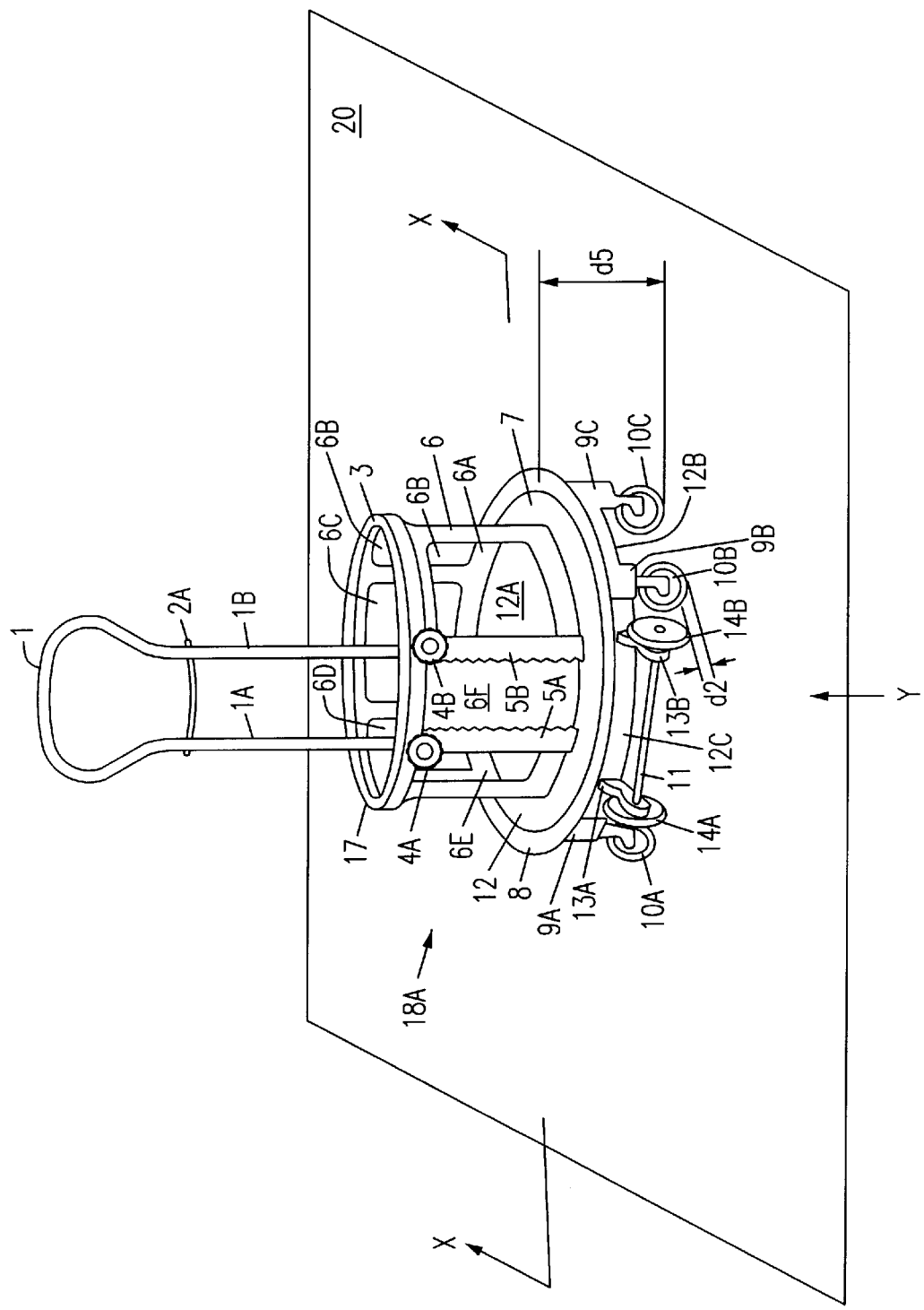
FIG. 1 illustrates one embodiment of a dolly-truck in an upright position in accordance with this invention.
Figure 7C:
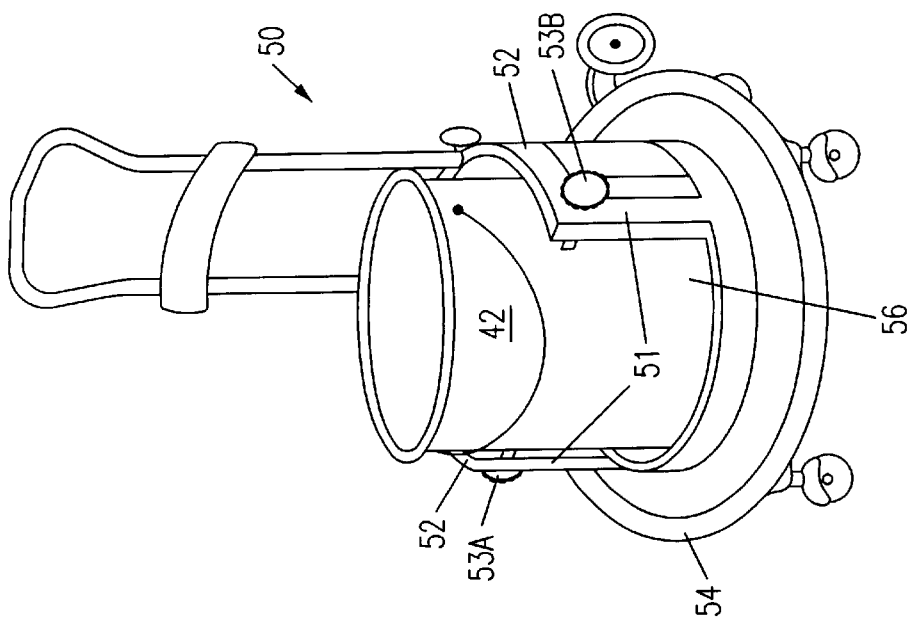
Figure 7B:
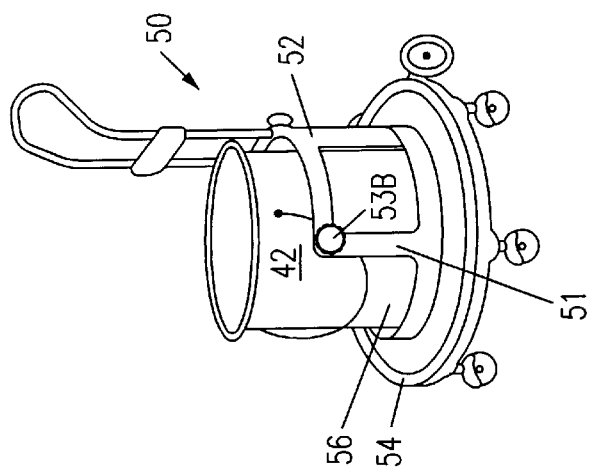

FIG. 1 illustrates one embodiment of a dolly-truck 18A that includes a body 17 for supporting the object to be conveyed, such as, for example, an open bucket of liquid (shown in FIGS. 7A and 7B for another embodiment). Body 17 includes a base 12 (also called "platform" having an upper surface 12A, a lower surface 12B and a periphery 12C. In one embodiment, base 12 is a solid fiberglass disk e.g. ¾ inch thick and 16 inches in diameter, although a base can be hollow depending on the embodiment (e.g. FIGS. 8A–8G).

On periphery 12C of base 12 are provided a number of caster wheel supports 9A, 9B and 9C. Although only three caster wheel supports 9A, 9B and 9C are visible in FIG. 1, dolly-truck 18A in this embodiment has a total of five caster wheel supports which are integrally connected to base 12 (see FIG. 2). Other numbers of caster wheel supports such as three, four, six or more are used in other embodiments.

Figure 2B:
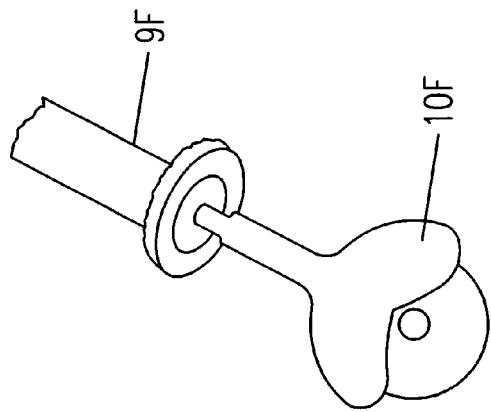
FIG. 2B illustrates a sleeve and a corresponding caster wheel for use in the body of FIG. 2A.
Figure 2A:
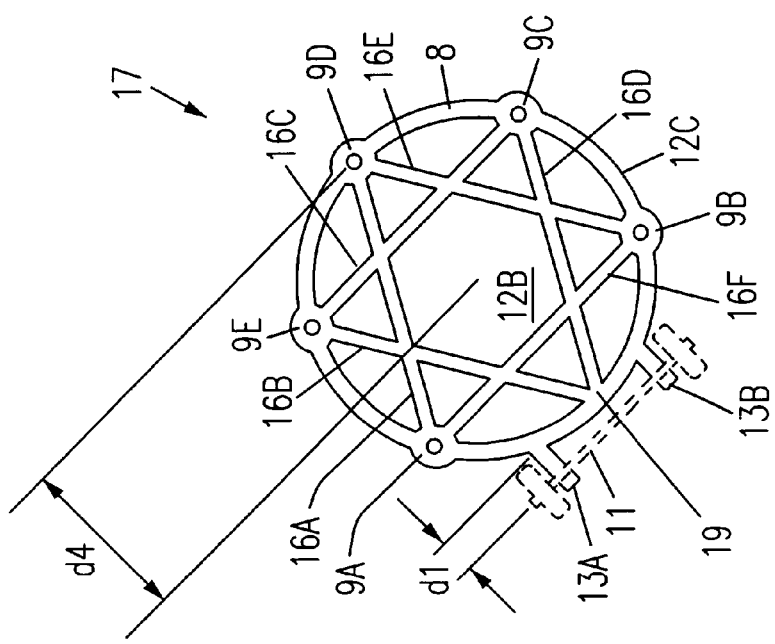
FIG. 2A illustrates a bottom view of the body of the dolly-truck taken in the Y direction shown in FIG. 1.

FIG. 2A shows a bottom view of body 17 of dolly-truck 18A of FIG. 1 as seen in the Y (i.e. vertical) direction. In the embodiment shown in FIG. 2A, five caster wheel supports 9A–9E are arranged at five corner-points of a hexagon which is substantially enclosed in periphery 12C of base 12 (FIG. 1). In one specific embodiment, caster wheel supports 9A–E are metal sleeves e.g. approximately 1 inch in outer diameter, ¼ inch in inner diameter and 12 inches in length. FIG. 2B illustrates a typical sleeve 9F which can be used as one of caster wheel supports 9A–9E (FIG. 2A).

On periphery 12C of base 12 are also provided a pair of truck wheel supports 13A and 13B integrally connected to base 12. Truck wheel supports 13A and 13B are arranged equidistant from a sixth corner-point 19 of the hexagon. In the embodiment shown in FIG. 2, body 17 is provided with ribs 16A–16F on lower surface 12B of base 12 to provide additional structural strength to base 12. Other structural features can also be used to provide strength to base 12. In one embodiment, no such additional features are provided in base 12 for strength.

Referring back to FIG. 1, in this particular embodiment, dolly-truck 18A has five caster wheels (such as 10A, 10B and 10C) supported by caster wheel supports (such as 9A, 9B and 9C). The five caster wheels 10A–10E are supported such that the centers of all five caster wheels 10A–10E lie in one plane (not shown explicitly). The five caster wheels 10A–10E provide dolly-truck 18A with rolling movement over short distances in an upright position.

The distance d4 between caster wheels 10A–10E from the center of base 12 is 9 inches, which is greater than the 6 inch radius of a bucket conveyed in one embodiment. Therefore periphery 12C completely encloses the area of upper surface 12A covered by the object being conveyed. Such an arrangement ensures stability of dolly-truck 18A allowing dolly-truck 18A to be propelled by foot and to be tilted easily. Also base 12 is at a distance d5 of e.g. approximately 4 inches from the ground surface 20. Base 12 being close to the ground surface 20 provides stability to dolly-truck 18A.

Caster wheels 10A–10E can be any caster wheel such as ball caster wheel 10F illustrated in FIG. 2B. In one embodiment ball caster wheels 10A–10E and sleeves 9A–9E are shielded chrome ball caster Part # CH 2051CP of Baker Sales Designers Hardware Catalog, 1993 available at any hardware store, such as Channel City Lumber, 35 Aero Camino, Goleta, Calif.

Dolly-truck 18A of FIG. 1 also has an axle 11 supported by truck wheel supports 13A and 13B. Two truck wheels 14A and 14B are mounted on axle 11 in a casterless manner, e.g. with ⅜ inch axle cap nuts Part # 887H from Hillman Fastener Catalog 1993 available at Mission Hardware 5754 Hollister Avenue, Goleta, Calif. The two truck wheels 14A and 14B also provide dolly-track 18A with rolling movement, but in the tilted position.

Although an axle 11 is used in the embodiment of dolly-truck 18A illustrated in FIG. 1, truck wheels 14A and 14B can be attached to a body 17 by any other mechanism provided the truck wheels 14A and 14B are mounted parallel to each other in a non-swivelling casterless manner. In one embodiment, truck wheels 14A and 14B are 4 inch rubber wheels Part # W.S.R.40 156N3 from Baker Sales Designers Hardware Catalog, 1993.

Truck wheel supports 13A and 13B extend forward from base 12 for a distance sufficient to provide clearance between truck wheels 14A and 14B and nearby caster wheels 10A and 10B respectively. The distance between a tangent to periphery 12 and a line parallel to the tangent passing through the center of axle 11 (shown dotted in FIG. 2) is the distance d1 in FIG. 2. In one embodiment, truck wheels 14A and 14B extend distance d1 of 4 inches from the periphery of base 12.

Also, truck wheel supports 13A and 13B are positioned such that truck wheels 14A and 14B have a clearance from ground surface 20 when caster wheels 10A, 10B and 10C are in contact with ground surface 20. Clearance d2 (FIG. 1) is the distance between ground surface 20 and a plane parallel to ground surface 20 and tangential to truck wheels 14A and 14B. In one embodiment, truck wheels 14A and 14B have a diameter of 3¾ inches and are mounted on truck wheel supports 13A and 13B so as to have a clearance of d2 ¼ inch from ground surface 20. Truck wheels 14A and 14B allow dolly-truck 18A to convey an object over obstacles or negotiate stairs with tilting motion of a hand truck.

Thus, when dolly-truck 18A is moved in an upright position (see FIG. 1), dolly-truck 18A moves with caster wheels 10A–10E in contact with ground surface 20. The clearance d2 between truck wheels 14A–14B and the ground surface allows dolly-truck 18A to be moved on caster wheels 10A–10E in the upright position without any interference from the casterless truck wheels 14A and 14B.

Figure 4:
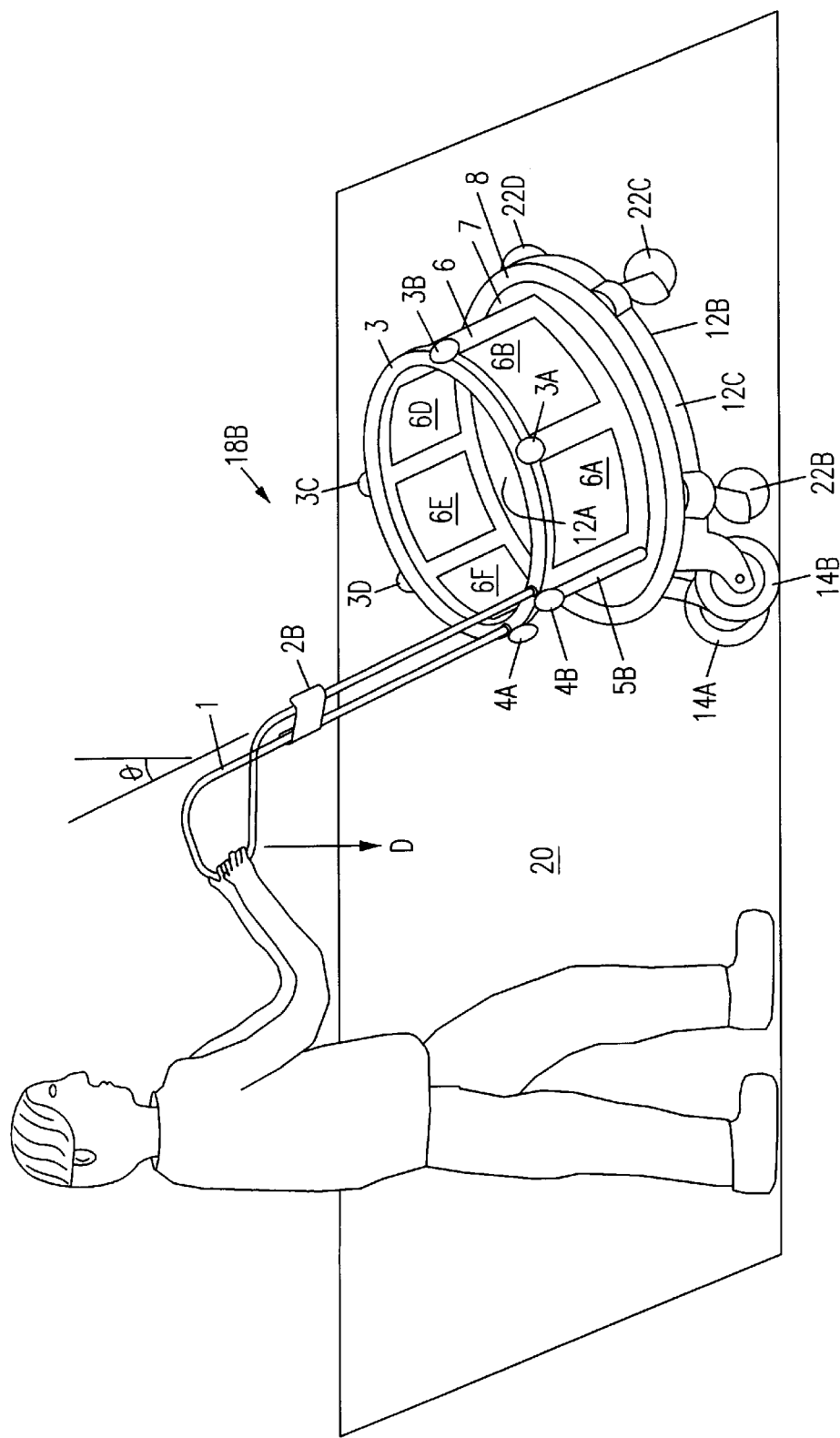
FIG. 4 illustrates one embodiment of a dolly-truck in a tilted position.

To negotiate obstacles, dolly-truck 18A is tilted using handle 1 and moved in a tilted position, in which case the caster wheels 10A–10E are off (i.e. do not contact) ground surface 20, and truck wheels 14A and 14B are in contact with ground surface 20, similar to the tilted position of dolly-truck 18B in FIG. 4. Dolly-truck 18A can be moved easily in a tilted position on truck wheels 14A and 14B because truck wheels 14A and 14B are mounted parallel to each other in a non-swivelling casterless manner. Furthermore, truck wheels 14A and 14B can be positioned along the edge of a stair to go up or down staircases.

The small amount of clearance d2 of e.g. ¼ inch allows dolly-truck 18A to move from the upright position into the tilted position within a small tilt angle $\theta$ (FIG. 4) of e.g. 10°. Such a small tilt angle allows a dolly-truck containing an open bucket with a liquid to be tilted without spilling the liquid on to ground surface 20. A larger tilt angle can be used if the center of mass of the liquid is low. Accordingly, dolly-truck 18A has the versatility to be used as a dolly for omnidirectional movement and at any time to be tilted and be used as a hand truck for negotiating obstacles.

Figure 3A:
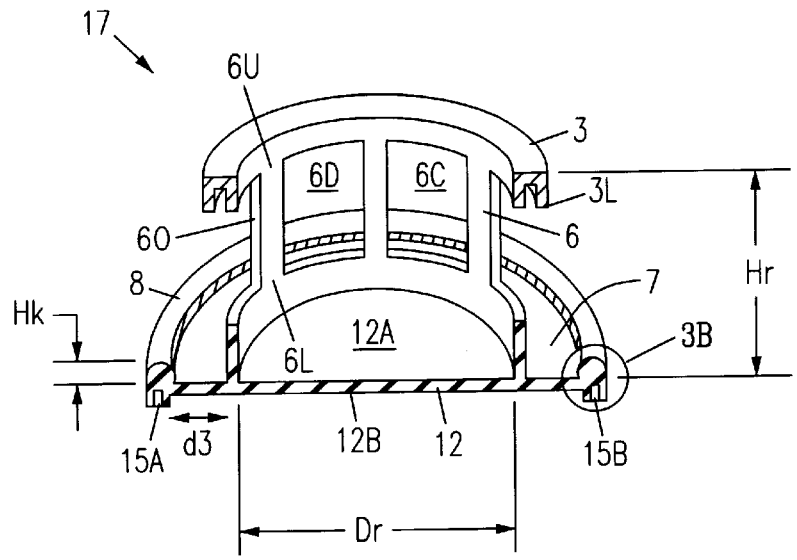
FIG. 3A illustrates an isometric cross-sectional view of the body of the dolly-truck taken in the X—X direction shown in FIG. 1.

FIG. 3A shows an isometric cross-sectional view of body 17 of dolly-truck 18A taken in the X—X direction shown in FIG. 1. Body 17 includes a retaining structure 60 formed in this embodiment by a wall (also called "retaining wall") 6, mounted in a central portion of upper surface 12A of base 12. In one embodiment, retaining wall 6 has a lower end 6L formed integral with base 12. However, retaining wall 6 can be formed as a separate piece that is attached to body 17, for example as illustrated in FIGS. 8A–8G and 9A–9E. Retaining wall 6 completely surrounds an object (e.g. a container) being transported and holds the object in its place (e.g. substantially stationary) on upper surface 12A of base 12 during movement of dolly-truck 18A (e.g. by kicking on a kick ring 8 as described below).

Therefore, retaining wall 6 of this embodiment has a height Hr that is at least sufficient to prevent the object from sliding around on base 12, and preferably sufficient to keep the object from tipping over during movement of dolls-truck 18A. Height Hr in one particular embodiment is larger than one quarter the height of the object and preferably larger than one third the height of the object. Moreover, height Hr is an order of magnitude larger than the height of a rib (e.g. one of ribs 16A–16F of FIG. 2 A). In one embodiment, height Hr is 7 inches and ribs 16A–16F have a height of 0.50 inch. In this embodiment, retaining wall 6 has a diameter Dr of 12 inches.

In this particular embodiment, retaining structure 60 has, at an upper end 6U of wall 6 (FIG. 3A), a retaining ring 3 with an optional lip 3L at the free end of ring 3. Retaining ring 3 serves to keep the top of an object e.g. a lid of bucket 42 (FIG. 3F) from moving substantially when dolly-truck 18A is moved or is tilted. Furthermore, in this embodiment, retaining wall 6 has holes 6A–6E (FIG. 1) that improve visibility of a label 55 (FIG. 3F) on bucket 42. In the embodiment of dolly-truck 18A of FIG. 3B, each caster wheel support (such as support 9C) is mounted in a slot (such as slot 15B). To assemble dolly-truck 18, axle 11 and truck wheels 14A and 14B are attached and sleeves 9A–9E are epoxied into the corresponding holes such as hole 15B of body 17 (FIG. 3C). Other methods of joining sleeves 9A–9E into their corresponding holes can also be used. Then caster wheels 10A–10E are popped into sleeves 9A–9E.

In one embodiment of this invention, instead of a ball caster wheel such as part number CH2051CP (above), dolly-truck 18A has a grip neck stem locking caster wheel (illustrated in FIG. 3D) such as part number 472-31-0012-00-00 of Plastic Guide Catalog 20-E, 1994 available from Plastic Guide-Comtek Division, 105 Progress Lane, Waterbury, Conn. 06705. Such a locking caster wheel (FIG. 3D) allows the caster wheel to be locked which in turn allows dolly-truck 18A to remain stationary on a tilted surface.

In one embodiment of dolly-truck 18, body 17 (FIG. 3A) includes a kick ring 8 mounted on a top portion of periphery 12C of base 12. Kick ring 8 allows short distance rolling of dolly-truck 18A in the upright position by a user pushing on kick ring 8 with the user's foot which frees the user's hands. In one embodiment, kick ring 8 has a cross-sectional diameter of e.g. 1 inch. Therefore, retaining wall 6 (FIG. 3A) has a height Hr that is larger than the height Hk (FIGS. 3A–3B) of kick ring 8. In one particular embodiment, retaining wall height Hr (e.g. 7 inches) is several times the kick ring height Hk (e.g. 1 inch).

In one embodiment of dolly-truck 18, a clearance is provided between kick ring 8 and retaining wall 6 to expose an annular portion of upper surface 12A of base 12. The annular portion forms a spill surface 7 that holds any contents (such as a liquid or a powdery chemical) spilled from an open bucket during any movement (in the upright or tilted position) of dolly-truck 18. In one embodiment, spill surface 7 has an annular width e.g. approximately 2½ inch (see annular surface width "d3" in FIG. 3A) around retaining wall 6.

In this embodiment, spill surface 7 (FIG. 3E) is also used to carry tools, such as a hammer 61, a roller brush 62, a flat brush 63 and scissors 64. As illustrated in FIG. 3E, such tools lie flat (e.g. horizontal) on spill surface 7, although tools can also be supported vertically as illustrated in FIG. 7G (described below). Kick ring 8 at the periphery of spill surface 7 ensures that such tools remain on spill surface 7 during movement of dolly-truck 18A. In this embodiment, the kick ring height Hk (e.g. 1 inch; see FIGS. 3A–3B) is greater than the thickness of a tool, e.g. flat brush 63 (FIG. 3E). In another embodiment, kick ring height Hk is smaller than a tool's thickness but is greater than one half of the tool's thickness. In any event, kick ring height Hk must at least be sufficient to prevent tools from sliding off surface 7 during movement or tilting of dolly-truck 18A.

Moreover, a user 65 (FIG. 3F) can sit on a lid 37 of bucket 42 centered at the center C (FIG. 3E) of retaining structure 60. While seated, user 65 can work (e.g., paint signs) and if necessary simply bend down to place a tool in or retrieve a tool from spill surface 7. Furthermore, user 65 can move dolly-truck 18A while seated on lid 37 by simply pushing on ground surface 20 with feet 65F, similar to moving an office chair while seated.

Figure 3B:
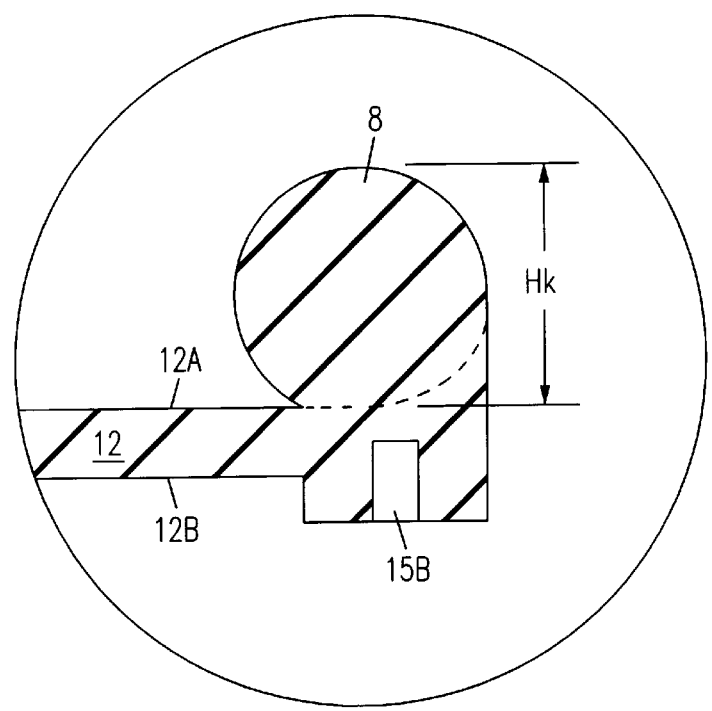
FIG. 3B illustrates, in an enlarged view, a portion of the body cross-section circled in FIG. 3A.
Figure 3C:
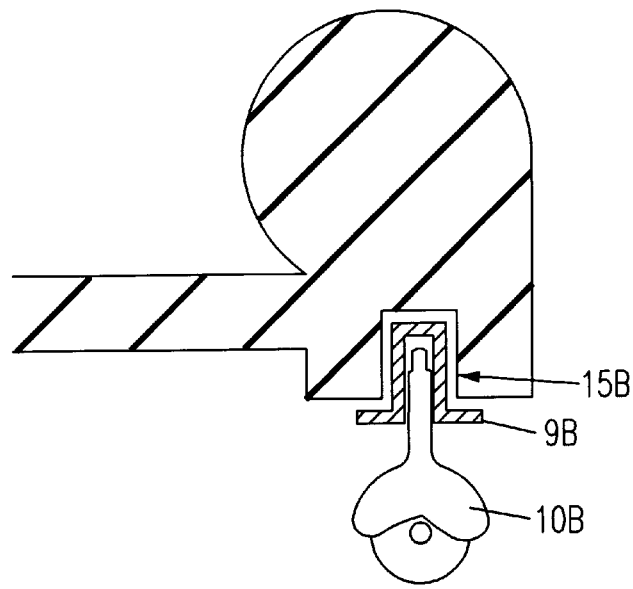
FIG. 3C illustrates assembly of the caster wheel of FIG. 2B into the body of FIG. 3B.
Figure 3D:
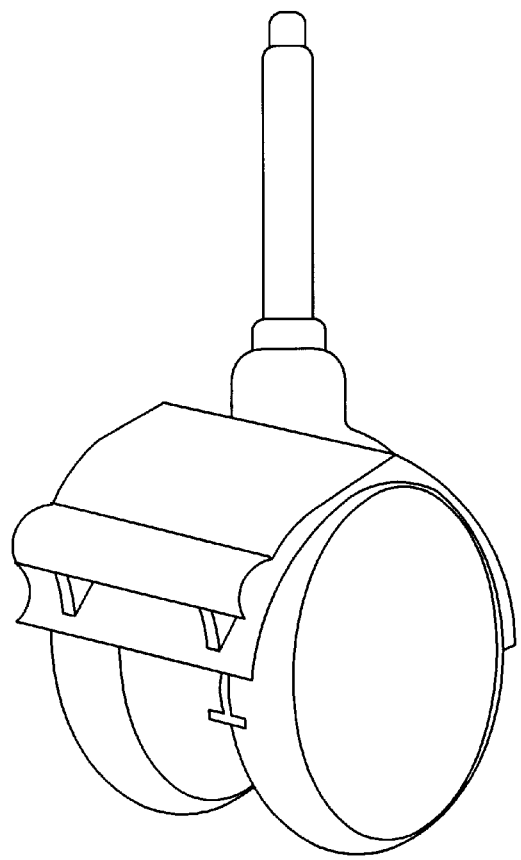
FIG. 3D illustrates a locking caster wheel for use in the body of FIG. 2A.
Figure 3E:
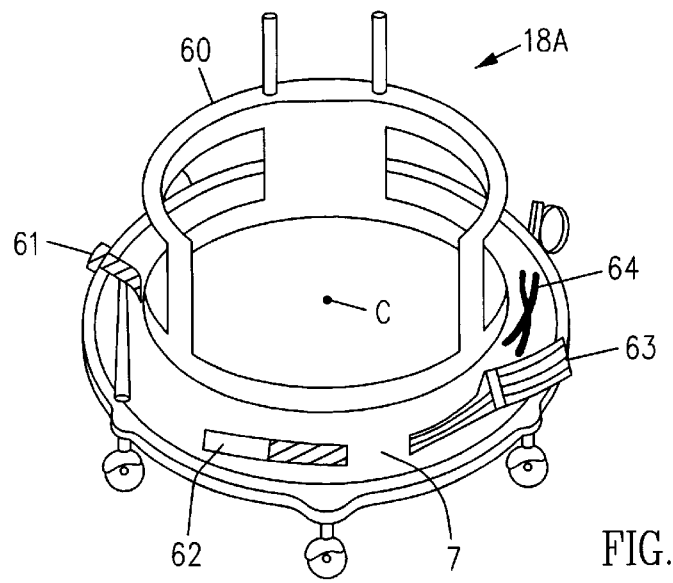
FIG. 3E illustrates, in a perspective view, the use of a spill surface to hold tools in the dolly-truck of FIG. 1.
Figure 3F:
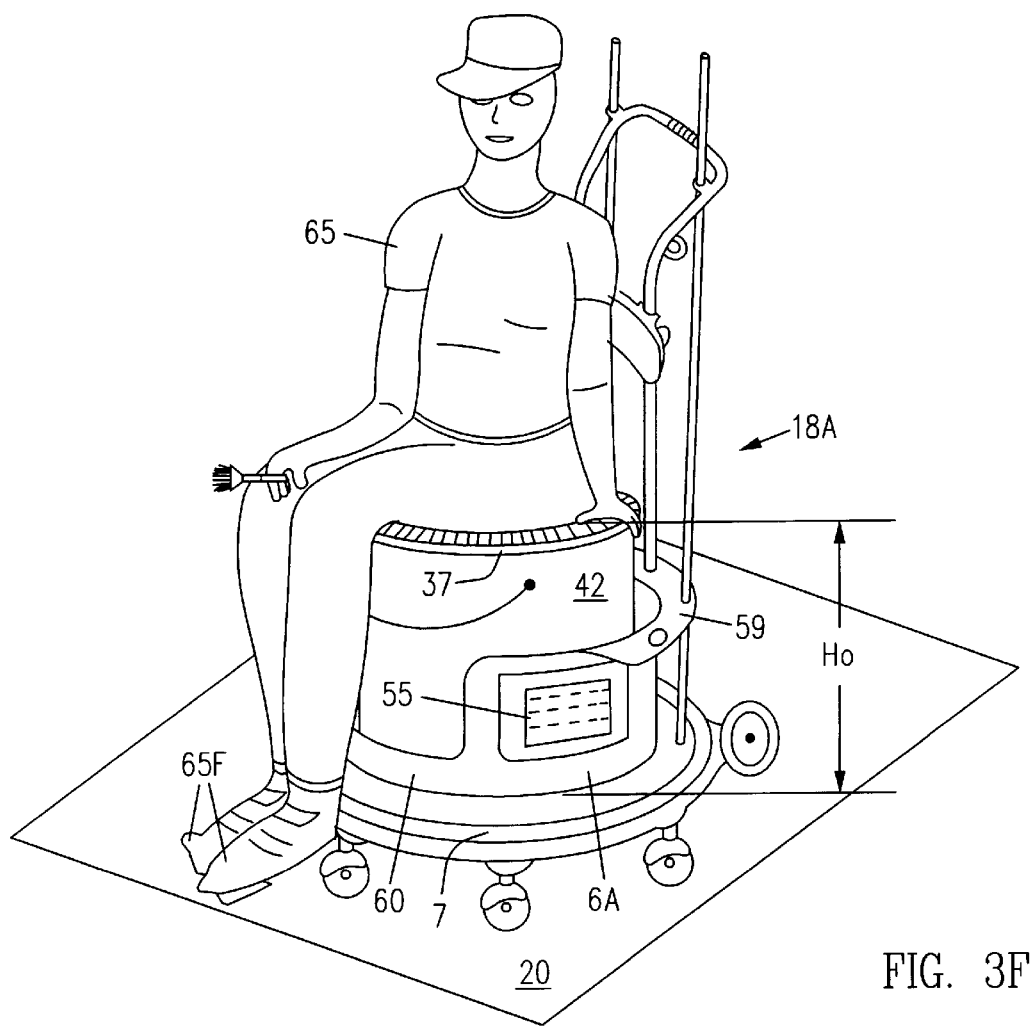
FIG. 3F illustrates, in a perspective view, use of the dolly-truck of FIG. 1 as a chair by a user.

In one embodiment of dolly-truck 18, caster wheel supports 9A, 9B and 9C are placed at the periphery of base 12, adjacent to and integrally connected with kick ring 8 (see FIG. 3B ). Such a distant placement of caster wheels 10A–10E from the center of base 12 provides greater stability to dolly-truck 18A as compared to placement of caster wheels 10A–10E closer to the center. Specifically, the peripheral placement of caster wheels 10A–10E permits propulsion by pushing on kick ring 8 with a foot.

Referring back to FIG. 1, dolly-truck 18A also includes an optional adjustable handle 1 which is connected to and extends forward and upward from body 17. Handle 1 has two arms 1A and 1B which are mounted in extension tubes 5A and 5B of retaining wall 6 and fictionally held in place in the extension tubes 5A and 5B, in this specific embodiment, by adjustment knobs 4A and 4B. Handle arms 1A and 1B are connected to each other by a handle brace 2A. The two arms of handle 1 are placed into extension tubes 5A and 5B and adjustment knobs 4A and 4B are tightened to secure handle 1 to body 17. Thus handle 1 is securely and rigidly attached to body 17 by knobs 4A and 4B so that body 17 tilts on truck wheels 14A and 14B when handle 1 is pushed downward in direction D (FIG. 4 ). The peripheral placement of caster wheels 10A–10E in supports 9A–9E (FIG. 3A) as described above allows easy tilting of body 17.

Figure 5:
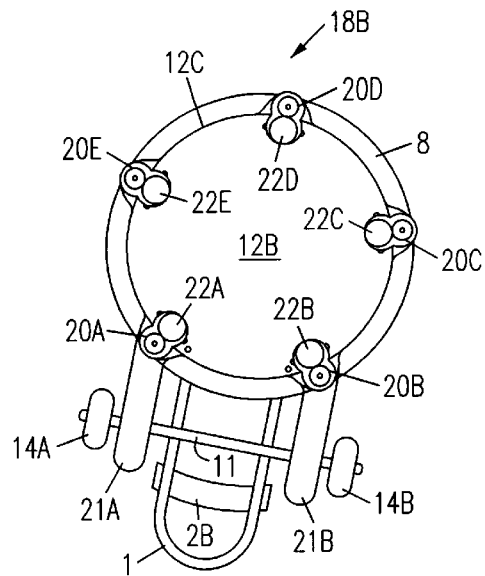
FIG. 5 illustrates a bottom view of one embodiment of a dolly-truck.

In one embodiment, handle 1 is a single tube of aluminum of 13/16 inch outer diameter, 5/8 inch inner diameter and 38 inches in length, formed into a U shape as shown in FIGS. 1 and 5. Adjustment knobs 4A and 4B can be any knobs such as rosette knob for a ¼ inch Allen screw, Part # SPI 99-607-4 of Swiss Precision Instrument Catalog, 1993 from Specialty Tool & Bolt, 108 Aero Camino, Goleta, Calif.

Extension tubes 5A and 5B are formed as an integral part of retaining wall 6 and are supported by a solid portion 6F of wall 6. Extension tubes 5A and 5B have longitudinal holes (not shown) in the Y direction of sufficient diameter to accept arms 1A and 1B of handle 1. In one embodiment, longitudinal holes in tubes 5A and 5B have a diameter of 1¼ inch, a length of 7 inches, and longitudinal hole of diameter ¾ inch and 6½ inches depth. Also, extension tubes 5A and 5B have lateral holes (not shown) which are threaded to accept screws extending from adjustment knobs 4A and 4B. Handle 1 can be raised or lowered with respect to tubes 5A–5B, depending on the height of the user. Adjustment knobs 4A and 4B can be unscrewed to allow handle 1 to be moved up and/or down to adjust the position of handle 1. The position of handle 1 can be adjusted by an amount equal to the length of extension tubes 5A and 5B.

Handle 1 is used by a user to move dolly-truck 18A in a rolling movement in an upright position (FIG. 1A) similar to a conventional dolly and also to move dolly-truck 18A in a tilted position over obstacles (FIG. 4A) similar to a conventional hand truck. If handle 1 interferes with any given process or use of the dolly-truck, handle 1 can be completely removed from extension tubes 5A and 5B of retaining wall 6. Then retaining ring 3 is used to lift and carry dolly-truck 18A (and the bucket) when necessary. Such a configuration is especially advantageous for short distance movement activities such as painting, because body 17 of the dolly-truck 18A can be pushed by foot.

FIG. 4 shows an alternative embodiment of a dolly-truck 18B in accordance with this invention. Dolly-truck 18B has the same features as those discussed above for dolly-truck 18A of FIG. 1 (except for caster wheel supports, caster wheels and handle brace). Many of the same reference numerals are used in FIGS. 1 and 4 for convenience.

Caster wheel supports 20A–20E of dolly-truck 18B are arranged equidistant from each other at the five corners of a pentagon as shown in a bottom view in FIG. 5. Two caster wheel supports 20A and 20B are arranged adjacent truck wheel supports 21A and 21B. Caster wheels 22A–22E which are supported by caster wheel supports 20A–20E are shielded ball caster wheels. The shields on the balls prevent spilled liquid from being conveyed or tracked by wheels 22A–22E.

Also in the embodiment of FIG. 4, retaining ring 3 has retaining knobs 3A–3D (similar to adjustment knobs 4A and 4B ) with screws which secure the object being carried firmly to dolly-truck 18B. Dolly-truck 18B also has a handle brace 2B which is different from handle brace 2A of dolly-truck 18A. Handle brace 2B has a surface contoured (as described below in reference to FIG. 6A) to allow stacking of a number of buckets, one on top of another and moved by dolly-truck 18B in the tilted position illustrated in FIG. 4. Handle brace 2B is supported by handle 1 at a distance from base 12 sufficient for handle 1 to support one or more objects staked on top of one another.

In one embodiment, body 17 of dolly-truck 18A is formed as a single piece of fiber-glass and in alternative embodiments body 17 is formed of polyethylene or other polymeric material, of metals such as steel and/or aluminum or other material. Holes (such as holes1 5A and 15B) are either molded into body 17 as body 17 is being formed or drilled into body 17 after body 17 has been formed.

In one embodiment, body 17 of dolly-truck 18A is formed as one piece of injection molded, high-strength plastic. Extension tubes 5A and 5B, truck wheel supports 13A and 13B, caster wheel supports 9A, 9B, 9C, 9D and 9E, retaining wall 6, retaining ring 3, kick ring 8, base 12 and ribs 16A–16E and 16F are all molded into body 17.

Figure 6A:
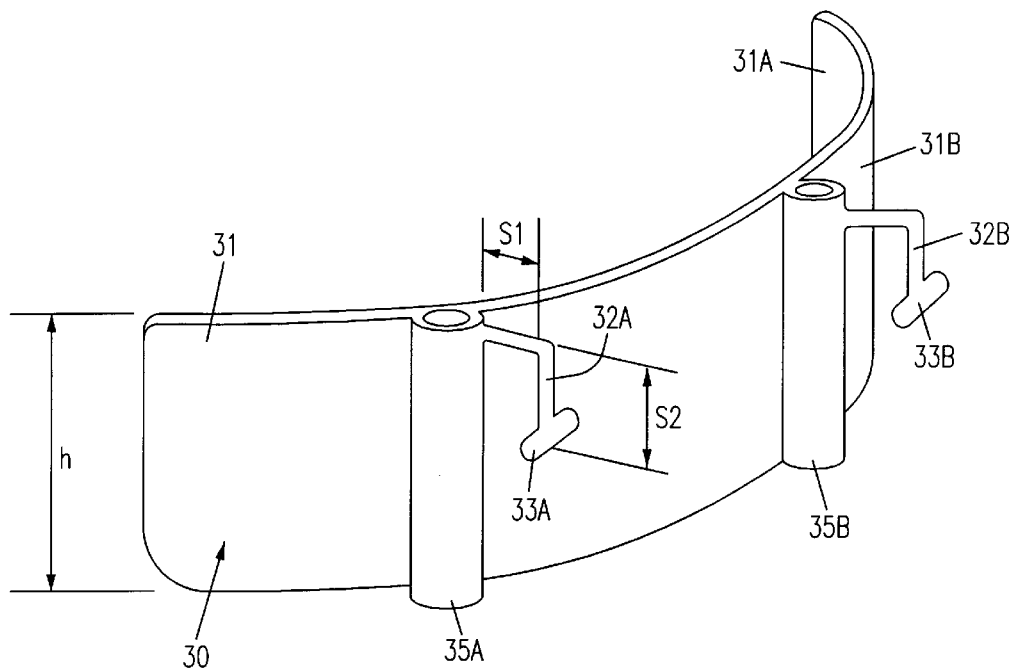

FIG. 6A illustrates a handle brace 30 similar to braces 2A and 2B (FIGS. 1 and 4) of respective dolly-trucks 18A and 18B. Handle brace 30 has a brace body 31 which has an inner surface 31A contoured to allow stacking of a number of buckets one on top of another. In one embodiment, surface 31A has a concave cylindrical curvature with a radius of 6 inches. Handle brace 30 also includes arm sleeves 35A and 35B on outer surface 31B of brace body 31. Arm sleeves 35A and 35B are similar to extension tubes 5A and 5B (above) and have an outer diameter of e.g. 1¼ inch and an inner diameter of ¾ inch. Handle brace 30 has a height H e.g. 2½ inches.

Also included in handle brace 30 are lid clips 32A and 32B. Lid clips 32A and 32B preferably of a somewhat elastic material capable of being bent out of position and then snapping back into position, are supported at one end by arm sleeves 35A and 35B respectively. At the other end, lid clips 32A and 32B are provided with finger grips 33A and 33B respectively. Lid clips 32A and 32B are formed in the shape of an L with the shorter leg having a length S1 e.g. ⅜ ths inch and the longer leg having a length S2 e.g. ½ inch.

Lid clips 32A and 32B are used to hold a lid 37 of e.g. a five gallon bucket 42 in a dolly truck 40 as shown in FIG. 6B. The arms of handle 41 are passed through arm sleeves 35A and 35B of handle brace 30. A lid 37 is supported by lid clips 32A and 32B by pulling finger grips 33A and 33B outward and sliding lid 37 in the space between lid clip 32A and 32B and arm sleeve 35A and 35B respectively (FIG. 6C), and releasing finger grips 33A and 33B.

Instead of "L" shaped clips 33A–33B (FIGS. 6A–6C), other types of clips can also be used in a dolly-truck. For example, clips 38–39 (FIGS. 6D–6F) have the shape of the letter "S". Specifically, clips 38–39 have upper portions 38U–39U respectively in the shape of the letter "J", and are connected to a brace 40 (at the respective short ends of the "J" portion) by respective bolts 41–42 (FIG. 6F). Upper portions 38U–39U allow clips 38–39 to hold a lid 37 (with the respective stems of the "J" portion) in the manner described above.

Figure 6E:
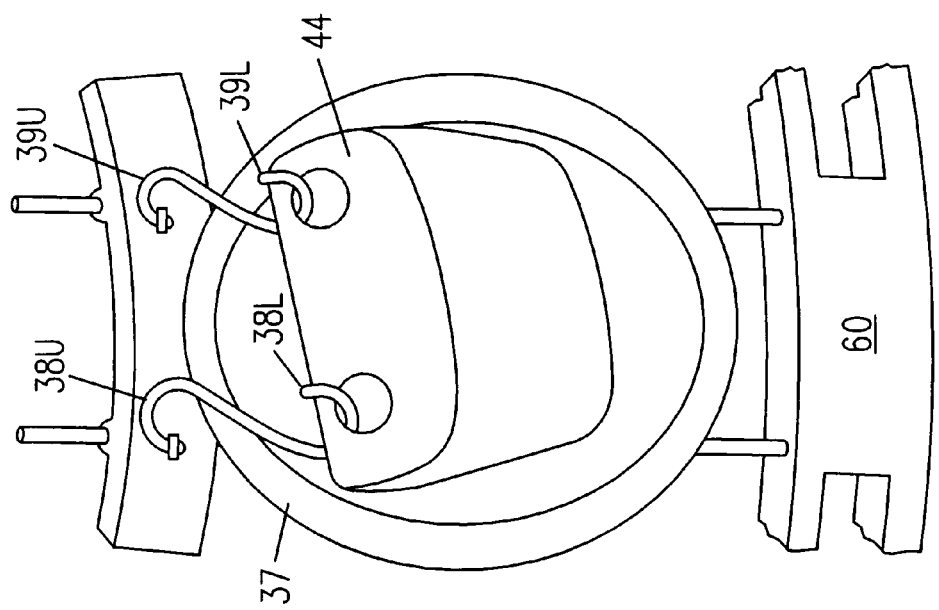
FIG. 6E illustrates, in an enlarged view, the use of the clips of FIG. 6D to hold a basket and bucket lid simultaneously.
Figure 6D:
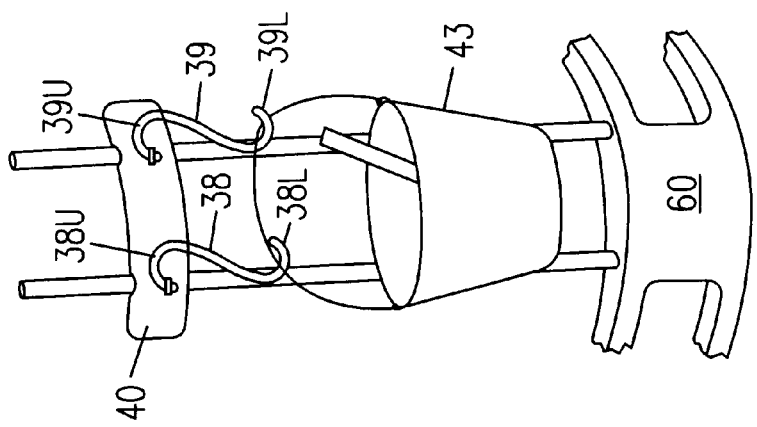
FIG. 6D illustrates, in an enlarged view, use of clips in an alternative embodiment for holding a bucket.

Clips 38–39 also have lower portions 38L–39L respectively that also have the shape of the letter "J" and are used as hooks to hold objects, such as a handle of a container, such as bucket 43 (FIG. 6D) or a basket 44 (FIG. 6E). Bucket 43 can be used to hold a powdery chemical or a liquid for use with tools 61–64 (FIG. 3E). Alternatively, basket 44 can be used to hold additional such tools. Therefore, the same clips 38–39 are used to simultaneously hold two different items: a lid 37 and a basket 44 (FIG. 6E). Such dual use eliminates the need for an additional set of clips (one set for each use) and so reduces cost.

Note that in this embodiment, height Hr (FIG. 6B) of the retaining structure 60 is at least one quarter as large as height Ho of bucket 42. Height Hr is preferably at least one-third of height Ho, and ensures that retaining structure 60 holds bucket 42 during movement of the dolly-truck.

In the embodiment illustrated in FIG. 6F, body 17A is substantially identical to body 17 discussed above except that body 17A includes brace 40 and tubes 45 and 46. Tubes 45–46 are secured by knobs 4A–4B into extension tubes 5A–5B as described above, although in an alternate embodiment tubes 45–46 can be epoxied (i.e. permanently mounted) in tubes 5A–5B. Tubes 45–46 support brace 40 which in turn has arm sleeves 47A–47B to receive handle 48. In this particular embodiment, the same screws 41–42 that are used to secure clips 38–39 to brace 40 are also used to secure handle 48 in tubes 47A–47B. In one variant of this embodiment, arm sleeves 47A–47B are formed by tubes 45–46 (FIG. 6G), although in another embodiment, tubes 47A–47B are formed as holes molded into brace 40.

In body 17A (FIG. 6F), handle 48 can be replaced by handles of other shapes and configurations that may be required for different purposes. In one embodiment, arm sleeves 47A–47B are formed as portions of tubes 45–46, and the position of handle 48 with respect to retaining structure 60 can be adjusted by a distance at least equal to the length of tubes 45–46 by sliding the arms 48–48B into (and out of) tubes 45–46. The position of handle 48 can be further adjusted an additional length of extension tubes 5A–5B by sliding the tubes 45–46 into (and out of) extension tubes 5A–5B.

FIGS. 7A–7C illustrate another embodiment of a dolly truck 50 having a retaining wall 51 and a retaining ring 52 which are open in region 56, and in all other respects dolly truck 50 has the same components as dolly truck 18A of FIG. 1. The open arrangement of dolly-truck 50's retaining wall and retaining ring FIG. 7A permits bucket 42 to be placed in the center on upper surface 54A of base 54 without bucket 42 having to be lifted over the retaining ring (which is necessary for dolly-truck 18A of FIG. 1). In the specific embodiment shown in FIGS. 7A–7C, retaining wall 51 and retaining ring 52 are semi-circular in shape, although any other open shape can be used in other embodiments. Bucket 42 is securely held in place on base 54 by retaining knobs 53A and 53B (similar to retaining knobs 3A–3D of FIG. 4 above).

Figure 7D:
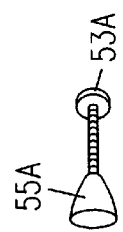
FIG. 7D illustrates the retaining knob of FIG. 7A having at one end a suction cup for holding an object in the dolly-truck.
Figure 7F:
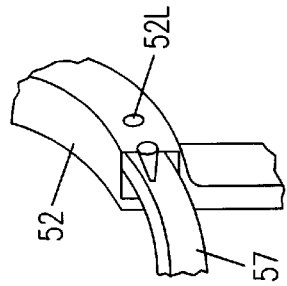
FIG. 7F illustrates, in an enlarged view, the push-button latch of FIG. 7E used to lock the closure member into the retaining ring.
Figure 7H:
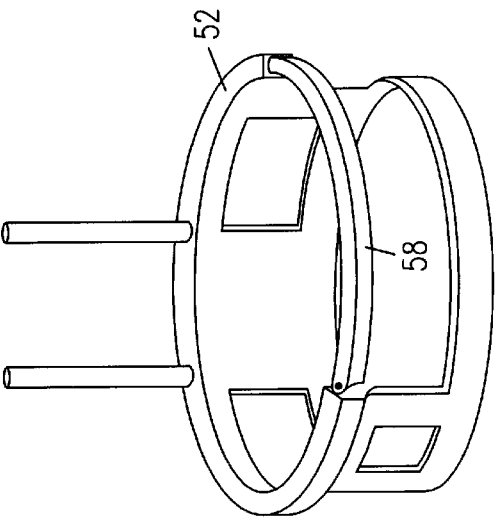
FIG. 7H illustrates the retaining structure of FIG. 7G with the closure member in the closed position.

In one particular embodiment, each of knobs 53A–53B has a holding device, e.g. a suction cup 55A attached at one end of knob 53A (FIG. 7D). Suction cup 55A (or any other such holding device) is pushed against a cylindrical surface of bucket 42 when the adjustment knob 53A is screwed in, and thereby holds bucket 42 in place during movement of dolly-truck 50.

Figure 7E:
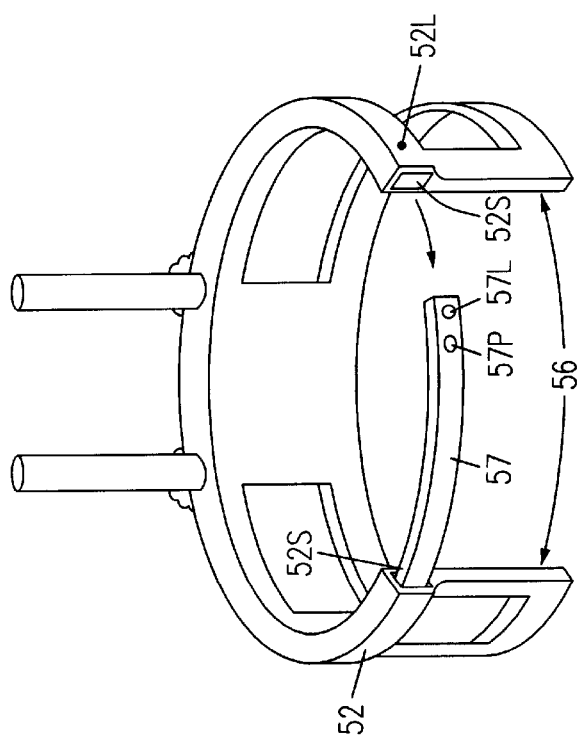
FIG. 7E illustrates, in a perspective view, another retaining structure having a closure member for opening a retaining ring.
Figure 7G:
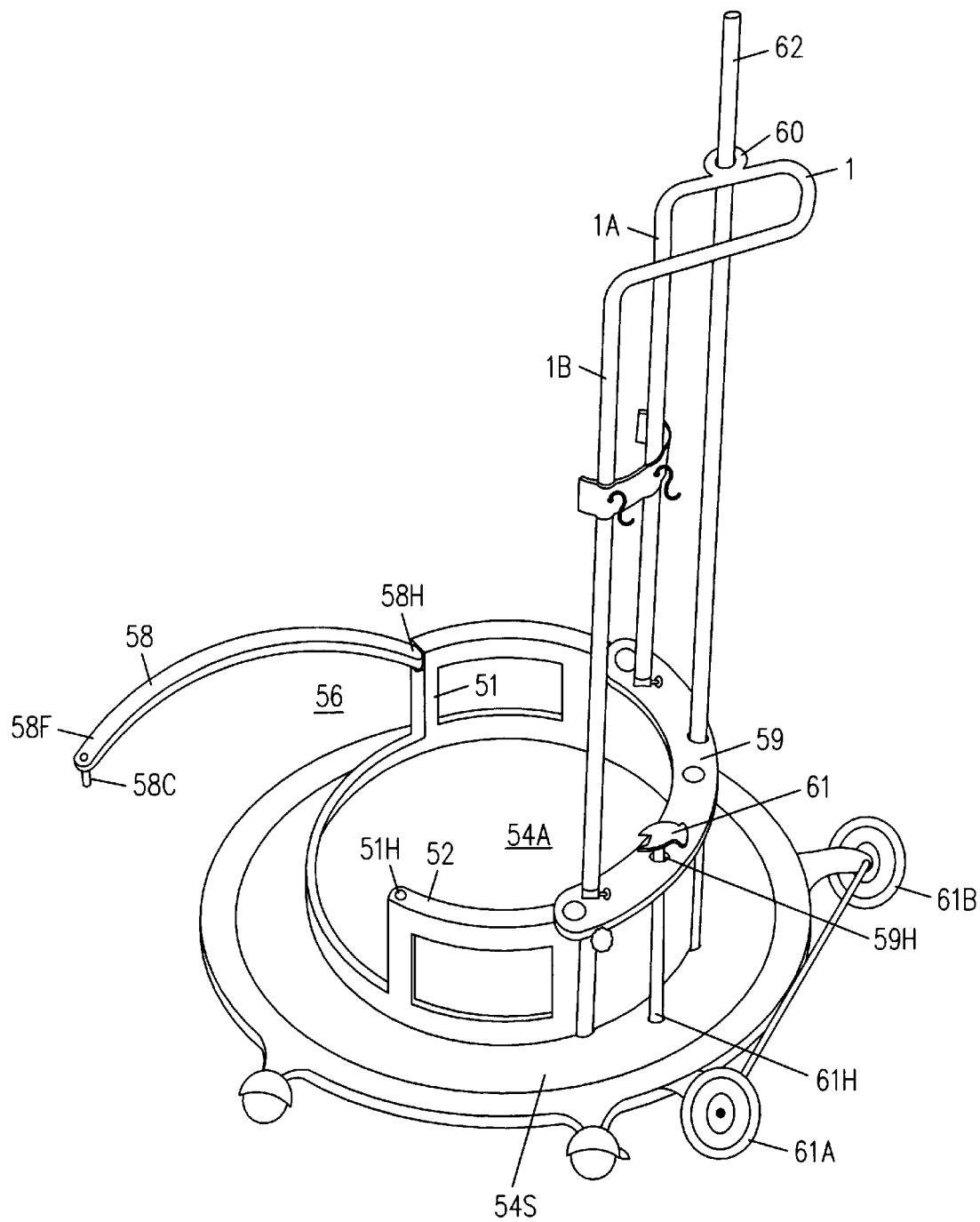
FIG. 7G illustrates yet another retaining structure that has a hinged closure member.

In another embodiment, dolly-truck 50 includes a closure member 57 that closes the opening in region 56 (FIG. 7E). In this particular embodiment, retaining ring 56 is hollow, and closure member 57 slides into a space 52S enclosed by retaining ring 52. Closure member 57 includes a latch 57L (e.g. a spring loaded button) which locks into another hole 52L in retaining ring 52 for closing the opening 56 during operation of dolly-truck 50. To form opening 56, the user merely pushes on latch 57L with one hand while pulling a peg 57P (formed on closure member 57) in a direction away from hole 52L (see direction Z in FIG. 7E), thereby to slide closure member 57 into retaining ring 52.

In another embodiment, closure member 58 (FIG. 7G) is mounted by a hinge 58H to retaining wall 51, thereby to allow closure member 58 to pivot while forming the opening 56. Closure member 58 also includes a latch 58L for securing the free end 58F to retaining ring 52 as illustrated in FIG. 7H. Latch 58L can also be a spring loaded button that can be pulled up from a hole 51H in wall 51, thereby to allow pivoting of closure member 58 about retaining wall 51.

In this particular embodiment, dolly-truck 50 also includes a shelf 59 mounted on retaining ring 52 adjacent to but above truck wheels 61A–61B in a plane parallel to surface 54S. Shelf 59 has a number of holes, e.g. hole 59H that can be used to hold tools. For example, a handle 61H of hammer 61 is inserted through hole 59H so that handle 61H is supported on spill surface 54S. Although not illustrated in FIG. 7G, spill surface 54S can have an indentation located opposite to hole 59H of shelf 59 to receive handle 61H, thereby to keep hammer handle 61H substantially parallel to retaining wall 51.

Any number of such devices for holding and supporting tools can be physically attached to any portion of dolly-truck 50. For example, dolly-truck 50 also includes, mounted on handle 61, a clip 60 that holds a pole 62 passing through another hole (not labelled) in shelf 59 and supported on spill surface 54S (pole 62 is also held parallel to retaining wall 51). Moreover, although not illustrated in FIG. 7G, pole 62 can be supported on spill surface 54S even in a dolly-truck devoid of shelf 59, because pole 62 is held by clip 60.

In another embodiment, a dolly-truck 100 (FIG. 10A) includes a base 80 (FIGS. 8A–8G) formed separate and distinct from retaining structure 90 (FIGS. 9A–9E). Retaining structure 90 is attached to base 80, for example, by fasteners (not shown in FIGS. 8A–8G, 9A–9E and 10A–10B), such as screws or bolts. Base 80 is similar to the above-described base 12 (FIG. 1) and base 54 (FIG. 7 A) except for the following differences. Base 80 (FIG. 8A) has a substantially annular shape with an opening 80H in the center C. Opening 80H of a size sufficient to allow a hand, a hose or cleaning equipment to be moved easily through the opening, allows dolly-truck 100 to be cleaned more easily than dolly-truck 18A (FIG. 1). Hole or opening 80H also results in dolly-truck 100 requiring less material and having lower weight and cost as compared to dolly-truck 18A.

Figure 8A:
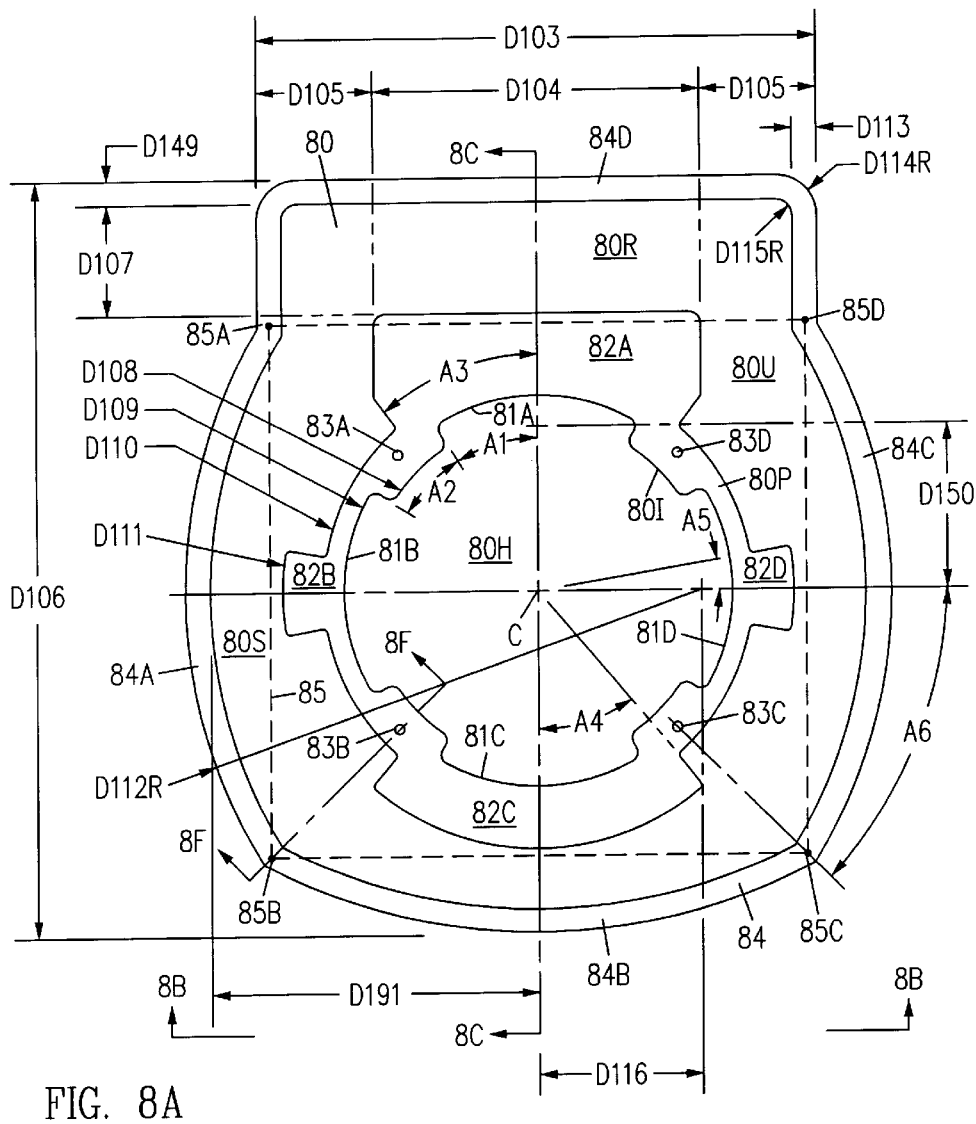
FIGS. 8A–8G illustrate a base formed by rotational molding in one embodiment of the invention.
Figure 8B:
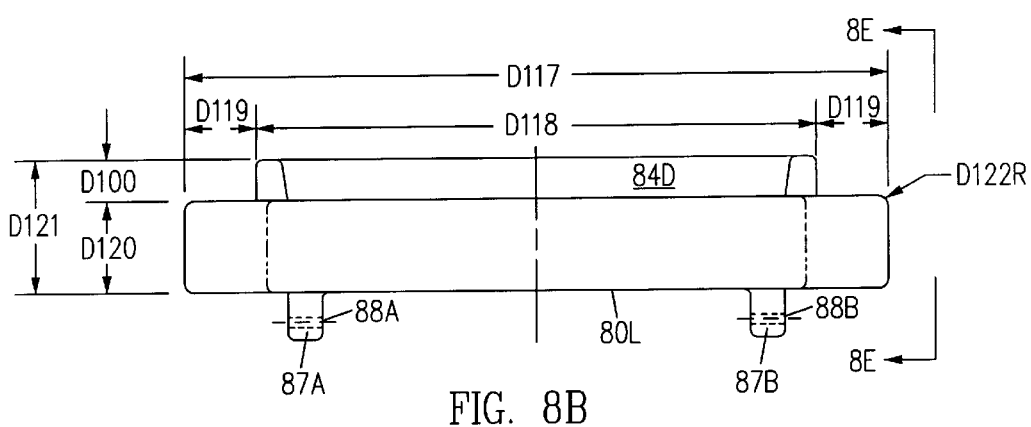
Figure 8C:
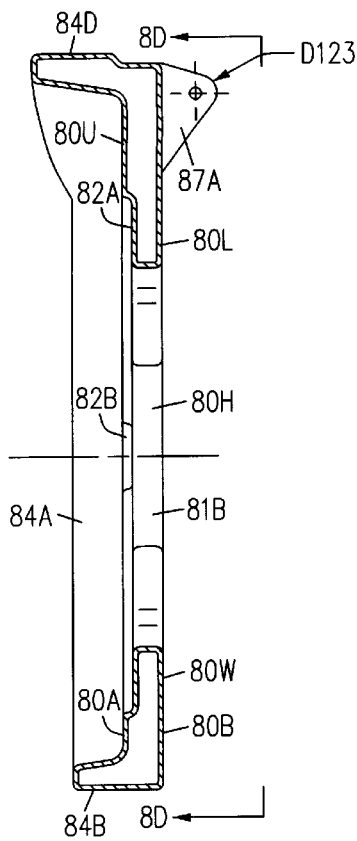
Figure 8D:
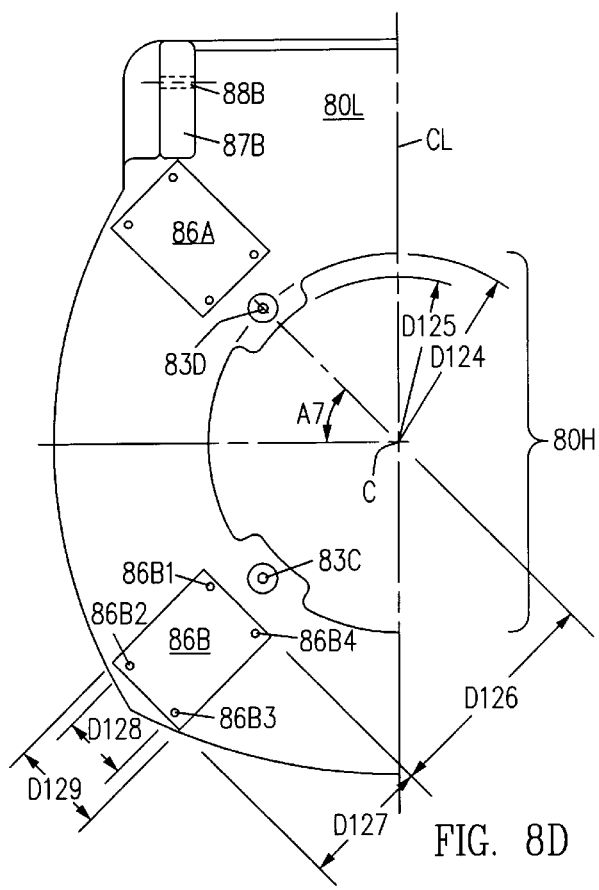
Figure 8E:
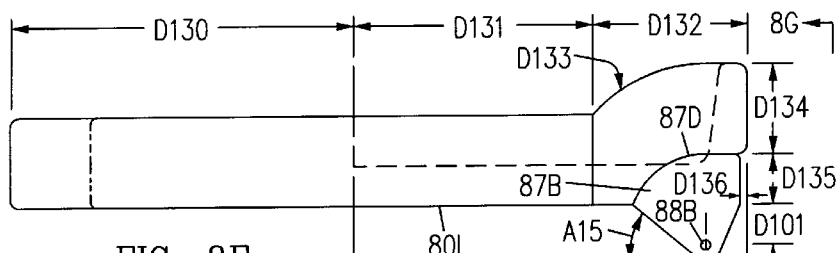
Figure 8F:
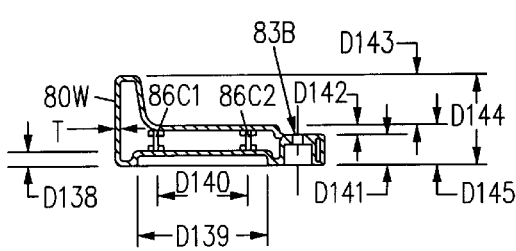
Figure 8G:
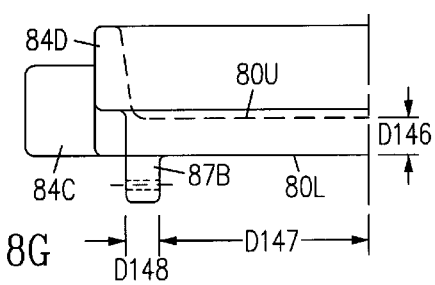
Figure 9A:
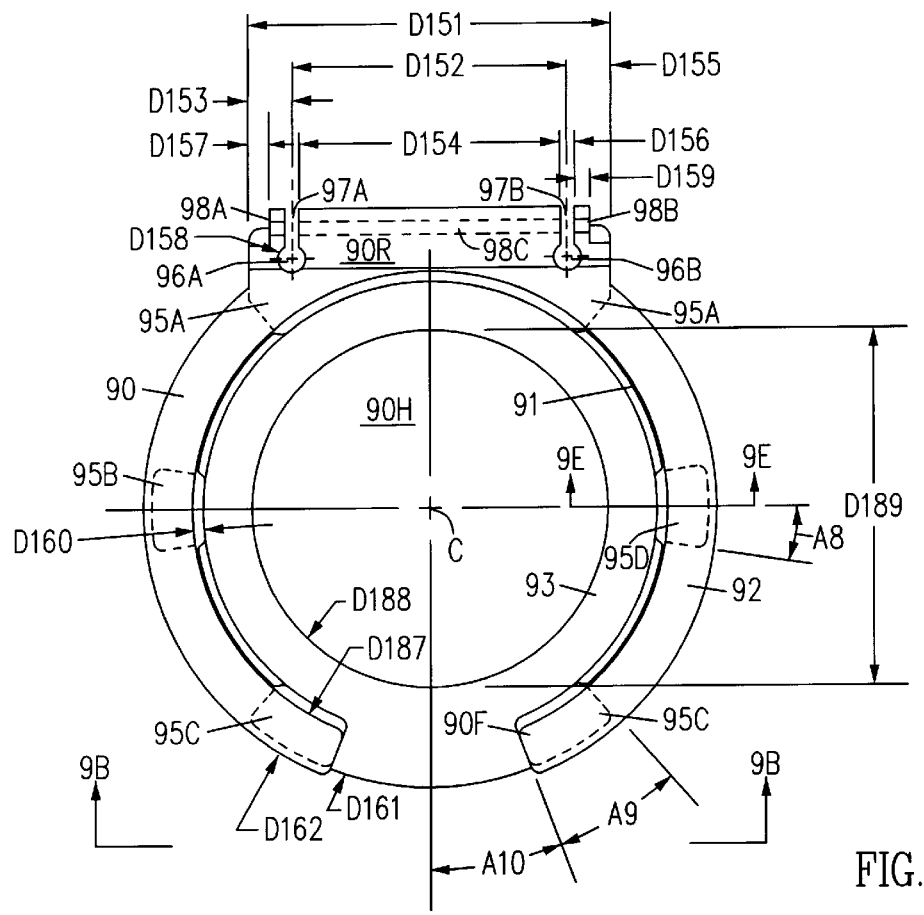
Figure 9B:
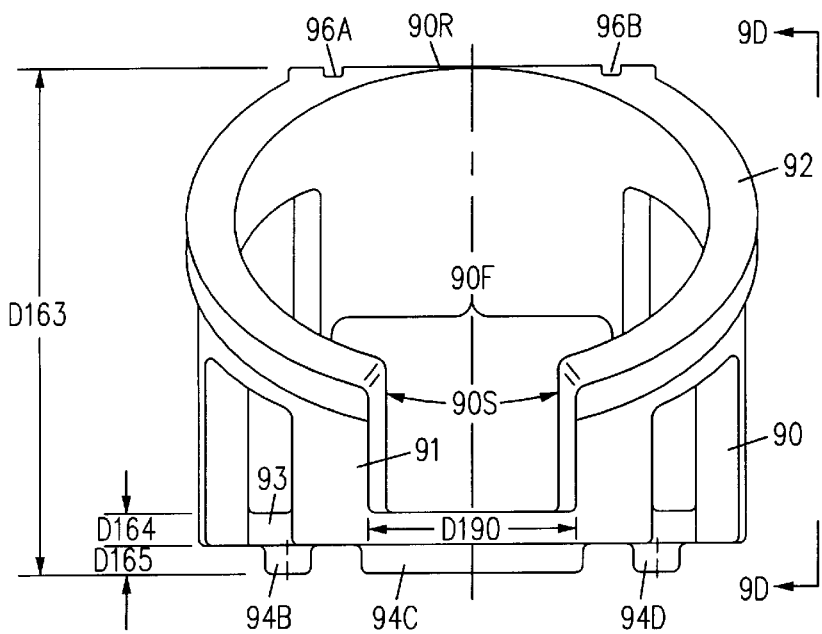

In the embodiment illustrated in FIGS. 8A–8G, hole 80H is keyed by recesses 81A–81D formed symmetric with respect to each other around and as part of an inner periphery 80I of base 80. Recesses 81A–81D accommodate tabs (described below) of retaining structure 90 (FIG. 9A) when retaining structure 90 is attached to base 80. Retaining structure 90 is used to hold, for example, a 5 gallon bucket. Moreover, base 80 (FIG. 8A) has depressions 82A–82D (e.g. ¼ inch deep) formed in an upper surface 80U of base 80. Depressions 82A–82D accommodate protrusions (described below) of retaining structure 90 (FIG. 9A). Specifically, in this embodiment, outer periphery 80P of depressions 82A–82D matches the footprint of retaining structure 90 (FIG. 9C). Such matching of footprint maximizes contact between the surfaces of structure 90 and base 80, thereby spreading the weight of an object carried by structure 90 over a larger surface of base 80 (as compared to a structure with a footprint unmatched by the base). Moreover, base 80 has a number of holes 83A–83D (FIG. 8A) that match the respective holes (also described below) of retaining structure 90. Holes 83A–83D are used to hold fasteners that attach retaining structure 90 to base 80.

Base 80 also has a peripheral wall 84 similar to the above-described kick ring 8 (FIG. 1) except that wall 84 is not circular in shape (and also not circular in cross-section). Instead, peripheral wall 84 has a number of vertices, including four vertices 85A–85D (FIG. 8A) that are located at the four corners of a square 85. Vertices 85A–85D are located along the diagonals (not labeled) of square 85, thereby to permit placement of caster wheel supports (e.g. depressions 86A–86B of FIG. 8D) at a larger radial distance from center C, as compared to, for example, the circular periphery of kick ring 8 (FIG. 1). Specifically, use of four vertices 85–85D (FIG. 8A) of square 85 for placement of the caster wheel supports provides greater stability than the use of a circle with a radius same as the lateral distance D191 (FIG. 8A) of wall portions 84A–84C from center C.

Wall portions 84A–84C (FIG. 8A) are portions of peripheral wall 84 that are convex (e.g. arcs of a circle) and that connect four vertices 85–85B of square 85 on three sides of square 85. On the fourth side of square 85, peripheral wall 84 includes a fourth portion 84D formed in the shape of letter "U". Portion 84D connects vertices 85A and 85B, and encloses a rectangular portion 80R (FIG. 8A) of upper surface 80U thereby to provide support for a number of tools held in holes of a shelf (e.g. shelf 59 of FIG. 7G). In this particular embodiment, the width of portion 84D is larger (e.g. 50% larger) than the width of portions 84A–84C (FIG. 8B), thereby to ensure that such tools remain within rectangular region 80R. The larger width accommodates an area needed to support tools vertically (illustrated in FIG. 7G) as well as horizontally (illustrated in FIG. 3E).

In this particular embodiment, body 80 has four caster wheel supports formed by depressions 86A–86D (FIG. 8D) located adjacent to vertices 85–85D on the lower surface 80L. FIG. 8D illustrates only half of base 80 because base 80 is symmetric about center line CL. In this particular embodiment, caster wheel supports 86A–86D are formed as rectangular depressions (e.g. ¼ inch deep) to accommodate four FAULTLESS™ casters, part number EP4520, available in any hardware store. Although rectangular depressions are illustrated in FIG. 8D, other types of caster wheel supports, such as hole 15B (FIG. 3C) can also be used in other embodiments.

Note that in this particular embodiment, dolly-truck 100 requires only four caster wheels (not labelled; only three shown in FIGS. 10A–10B), one less than dolly-truck 18A (FIG. 1), thereby reducing cost. The four caster wheels provide adequate support because bucket 42 (FIG. 10B) is located in the center C (FIG. 9A) of retaining structure 90. Therefore, bucket 42's weight is concentrated on an annular lip 93 (as described below) that is surrounded by the four caster wheels (FIG. 10A).

Body 80 also includes two truck wheel supports 87A–87B (FIG. 8B) that are formed (e.g. as tabs) on lower surface 80L of base 80, underneath rectangular region 80R on upper surface 80U. Truck wheel supports 87A–87B have the respective axle holes 88A–88B formed at a distance D101 (FIG. 8E) from lower surface 80L. In this particular embodiment, truck wheels (not shown in FIG. 8E) have a diameter of 4 inches. Distance D101 is selected so that the height of truck wheels (e.g. 3 inches due to 1.25 inch wheel well 87D in lower surface 80L) is smaller than the height of caster wheels (e.g. 3¼ inches). Therefore in this embodiment, there is a clearance d2 (FIG. 10A; e.g. 0.25 inch), between the truck wheel (not labelled) and the ground surface 20.

In one particular embodiment, base 80 is substantially hollow (see FIGS. 8C and 8F) and is formed by rotational molding. In rotational molding, a molding material (e.g. polyethylene) is poured into a mold that is closed and rotated about two axes (a major axis and a minor axis) inside an oven for a predetermined period of time, and thereafter cooled and the mold is opened to take out the molded part. Rotational molding typically results in a hollow part, also called "double walled part" because of two walls, e.g. two portions 80A and 80B (FIG. 8C) of wall 80W. In this particular embodiment, wall 80W is formed of a plastic, e.g. cross-linked polyethylene. In another embodiment, other plastics such as high-density polyethylene and low-density polyethylene are used.

In one particular variant of this embodiment, wall 80W (FIG. 8F) has a thickness T in the range of 0.125–0.150 inch, depending on various parameters of the molding process. In this variant, each of holes 83A–83D (e.g. hole 83B in FIG. 8F) has a diameter of 0.31 inch, with a counter sunk region of diameter 0.75 inch used for a fastener, such as a ¼–20 bolt. Note that base 80 in this embodiment includes, around each of holes 83A–83D (FIG. 8A), a region that is not hollow, but is formed by two portions of wall 80W coming together, and is called a "kiss-off". "Kiss-offs" are well known in the art of rotational molding. The "kiss-offs" of wall 80W (FIG. 8C) transfer the weight of base 80 to the respective fasteners (described below), for example when retaining structure 90 is used to lift dolly-truck 100 (FIG. 10A).

In one specific embodiment, base 80 includes four metal inserts for each caster wheel support, e.g. inserts 86B–86B4 for caster wheel support 86B (FIG. 8D) that are inserted into the mold prior to fabrication of base 80, and thereby become an integral part of base 80. The four metal inserts are used to mount a caster wheel having a plate with screws or bolts, for example, a bolt ¼ inch in diameter with 20 threads per inch. Instead of the four metal inserts, a metal sleeve (described above) can also be used to mount a caster wheel.

Retaining structure 90 (FIGS. 9A–9E) includes a retaining wal 91 and a retaining ring 92 similar to the above-described retaining wall 6 and retaining ring 3 (FIG. 1). In addition, retaining structure 90 includes an annular lip 93 (FIG. 9A) formed integral with retaining wall 91 and located opposite to retaining ring 92. Lip 93 is formed on an inner side of retaining walls so that retaining structure 90 has, in center C, an opening 90H defined by annular lip 93. Opening 90H has a predetermined diameter D189 (FIG. 9A) that is selected to be smaller than the diameter of an object to be carried in dolly-truck 100, so that lip 93 supports the bottom surface of the object at a periphery of the bottom surface. In one particular embodiment, the distance D189 is 9 inches, and annular lip 93 supports a bucket 42 (FIG. 10B) having a diameter of 10¼ inch, such as a five gallon bucket.

In this particular embodiment, a two-part mold (not shown) is used to form retaining structure 90 by rotational molding in a manner similar to that described above for base 80. In this embodiment, retaining wall 91 has a draft angle D177 (FIG. 9E) that allows the mold parts to be easily pulled out after formation of retaining structure 90. Retaining wall 91 also has a thickness T (FIG. 9E) in the range of 0.125–0.150 inch in this embodiment. Use of rotational molding for base 80 and structure 90 results in both these parts being hollow which reduces the cost and the weight of dolly-truck 100, as compared to the weight of dolly-truck 18A (FIG. 1).

Retaining structure 90 also includes a number of tabs 94A–94D (FIGS. 9B–9D) that lock into the respective recesses 81A–81D (described above). The interlocking recesses 81A–81D and tabs 94A–94D ensure that retaining structure 90 is located coaxial with base 80, i.e. centers C (FIGS. 8A and 9A; same reference numeral "C" is used for convenience coincide. Retaining structure 90 also includes a number of protrusions 95A–95D (FIG. 9C) that fit in the respective depressions 82A–82D (also described above). The interlocking protrusions 95A–95D and depressions 82A–82D ensure that retaining structure 90 is located in the same position with respect to base 80 each time dolly-truck 100 (FIG. 10A) is assembled. Finally, in this particular embodiment retaining structure 90 also includes metal inserts 90A–90D (FIG. 9C) at locations corresponding to the locations of holes 83A–83D (FIG. 8A). Inserts 90A–90D are used for holding fasteners used to attach retaining structure 90 to base 80.

In this particular embodiment, instead of adjustment knobs 4A–4B (FIG. 1) for holding handle 1, each of extension tubes 96A–96B (FIG. 9A) formed in rear portion 90R (FIG. 9A) of retaining structure 90 has a periphery that can be adjusted by adjusting the width of respective slots 97A–97B, e.g. by tightening screws in respective holes 98A–98B. Holes 98A–98B are formed e.g. by molding with a push pin and a hole 98C (FIG. 9A) is formed by drilling rear portion 90R between extension tubes 96A–96B in a direction perpendicular to slots 97A–97B.

In one particular embodiment, a carriage bolt (not shown in FIG. 9A) passes all the way through holes 98A–98C, with a head at one end (e.g. adjacent to hole 98A). Tightening a wing nut 101 (FIG. 10A) at the other end (e.g. adjacent to hole 98B ) makes extension tubes 96A–96B smaller, resulting in frictionally holding arms 1A–1B of an inserted handle 1. Note that slots 97A–97B (FIG. 9A) of this embodiment also allow retaining structure 90 to be separated from a mold part, as would be obvious to a person skilled in rotational molding.

Moreover, in the embodiment illustrated in FIGS. 9A–9E, retaining wall 91 has a varying height, with an upper end 91U (FIG. 9D) being located in a plane P1 (shown as a line in FIG. 9D) inclined with respect to another plane P2 passing through the lower end 91L. Specifically, retaining wall 91 has a rear portion 90R having the largest height (D174–D169) adjacent to extension tubes 96A–96B, and another portion (called "front portion") 90F located diametrically opposite to rear portion 90R and having the smallest height D168.

Figure 11A:
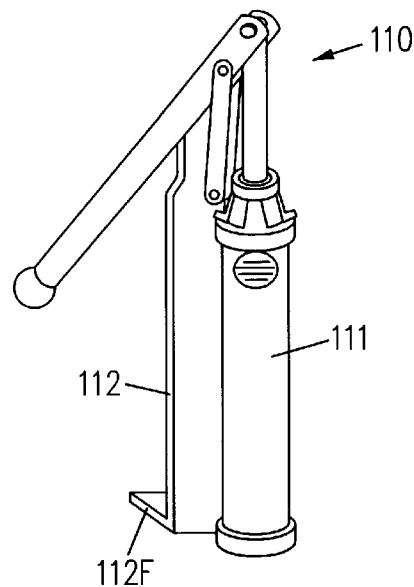
FIGs. 11A–11B illustrate a prior art bucket with a pump that can be moved by the dolly-truck of this invention.
Figure 11B:
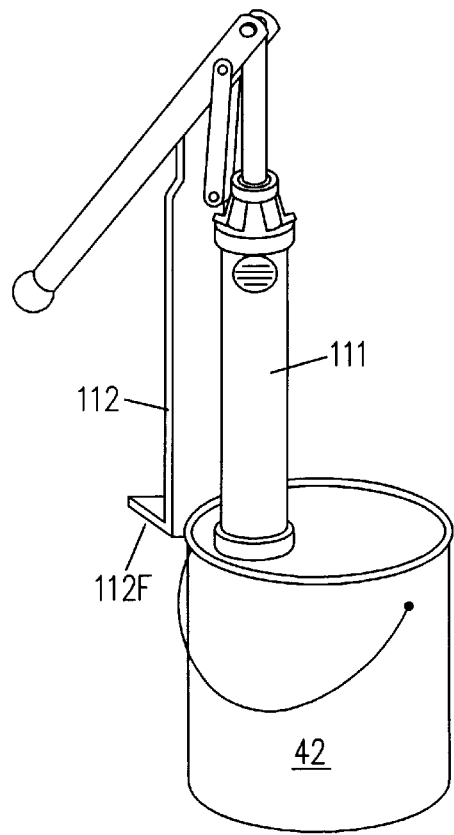

In this particular embodiment, retaining wall 91 and retaining ring 92 have a slot 90S (FIG. 9B) in front portion 90F. Slot 90S has a width just sufficient to allow passage of a pump 110 (FIGS. 11A–11B) during placement of bucket 42 into retaining structure 90. Prior art pump 110 typically includes a cylinder 111 supported by a leg 112 that is separated by a small clearance (e.g. ½ inch; see FIG. 10B) in which is located the wall of bucket 42 when cylinder 111 is placed inside bucket 42.

Slot 90S (FIG. 9B) allows bucket 42 with pump 110 installed thereon to be centered at center C (FIG. 9A) of retaining structure 90 with leg 112 (FIG. 10B) extending out through slot 90S such that a foot 112F rests spill surface 80S (FIG. 8A) adjacent to slot 90S. The width D190 (FIG. 9B) of slot 90S is made barely larger (e.g. ½ inch larger) than the width of leg 102 so that retaining wall 91 and retaining ring 92 substantially encircle (except for slot 90S) bucket 42 (FIG. 10B). In one particular embodiment, leg 102 has a width of 4 inches, and D190 is 4.5 inches. Such encircling is sufficient to retain bucket 42 in retaining structure 90 during movement of dolly-truck 100 (FIG. 10B) and eliminates the need for retaining knobs 3A–3D (FIG. 4), thereby reducing cost. That is, in this particular embodiment, retaining wall 91 and retaining ring 92 (FIG. 10B) are devoid of any holding devices for securing an object in dolly-truck 100. Note that dolly-truck 100 formed by attaching retaining structure 90 to base 80 can be used in two different industries, the drywall industry that requires slot 90S (FIG. 9B) for accommodating pump 110, as well as the paint industry that does not require slot 90S (which can therefore be left unused).

A dolly-truck as described herein can be (1) scooted along in the upright position by pushing with one's foot on a dolly-truck kick ring or peripheral wall, (2) pushed forward by use of a dolly-truck's handle, or (3) dragged with a paint extension pole (used for rolling wall surfaces) inside an open bucket carried by the dolly-truck.

In one particular embodiment, the dimensions of the dolly-truck of FIGS. 8A–8G and 9A–9E are listed in the Table below.

| Reference Numeral | Dimension in Inches (or Angle in °) |
|---|---|
| D100 | 1.25 |
| D101 | 1.0 |
| D103 | 15.5 |
| D104 | 9.0 |
| D105 | 3.25 |
| D106 | 20.5 |
| D107 | 3.0 |
| D108 | 4.5 |
| D109 | 5.25 |
| D110 | 5.75 |
| D111 | 7.0 |
| D112 | 14.0 |
| D113 | 0.75 |
| D114 | 1.0 |
| D115 | 0.25 |
| D116 | 4.5 |
| D117 | 19.0 |
| D118 | 15.5 |
| D119 | 1.75 |
| D120 | 2.5 |
| D121 | 3.75 |
| D122 | 0.25 |
| D123 | 0.5 |
| D124 | 5.25 |
| D125 | 4.5 |
| D126 | 6.13 |
| D127 | 3.25 |
| D128 | 1.75 |
| D129 | 2.62 |
| D130 | 9.5 |
| D131 | 6.75 |
| D132 | 4.25 |
| D133 | 4.75 |
| D134 | 2.5 |
| D135 | 1.25 |
| D136 | 0.25 |

-continued

| Reference Numeral | Dimension in Inches (or Angle in °) |
|---|---|
| D137 | 1.0 |
| D138 | 0.25 |
| D139 | 3.75 |
| D140 | 3.0 |
| D141 | 0.75 |
| D142 | 0.25 |
| D143 | 1.5 |
| D144 | 2.5 |
| D145 | 1.0 |
| D146 | 1.0 |
| D147 | 5.75 |
| D148 | 1.0 |
| D149 | 0.75 |
| D150 | 4.5 |
| A1 | 30° |
| A2 | 50° |
| A3 | 40° |
| A4 | 40° |
| A5 | 10° |
| A6 | 45° |
| A7 | 45° |
| D151 | 9.0 |
| D152 | 7.0 |
| D153 | 1.0 |
| D154 | 6.75 |
| D155 | 1.0 |
| D156 | 0.25 |
| D157 | 0.5 |
| D158 | 0.81 |
| D159 | 0.37 |
| D160 | 0.25 |
| D161 | 7.0 |
| D162 | 7.25 |
| D163 | 12.5 |
| D164 | 0.75 |
| D165 | 0.75 |
| D167 | 8.0 |
| D168 | 3.0 |
| D169 | 0.75 |
| D170 | 1.0 |
| D171 | 1.0 |
| D174 | 11.75 |
| D175 | 1.5 |
| D176 | 0.5 |
| D177 | 0.25 |
| D178 | 0.25 |
| D179 | 1.5 |
| D180 | 0.75 |
| D181 | 0.75 |
| D182 | 0.75 |
| D183 | 1.75 |
| D184 | 5.25 |
| D185 | 4.5 |
| D186 | 5.25 |
| D187 | 6.0 |
| D188 | 4.5 |
| D189 | 9 |
| D190 | 4.5 |
| A8 | 10° |
| A9 | 20° |
| A10 | 20° |
| A11 | 45° |
| A12 | 30° |
| A13 | 30° |
| A14 | 30° |
| A15 | 41.5° |
| A16 | 13.5° |

Although the present invention has been described in connection with the above described illustrative embodiments, the present invention is not limited thereto. For example, retaining wall 6 (FIG. 1A) can be formed as a solid surface without holes 6A–6E. Moreover, instead of five (or four) caster wheels and two truck wheels, any number of caster wheels and truck wheels can be used in accordance with this invention. Furthermore, although handle 1 (FIG. 1A) is described as being connected to body 17 in extension tubes 5A and 5B, a handle can be connected to a body in any conventional manner. Also, in an alternative embodiment, only base 80 (FIG. 10A) is solid and structure 90 is hollow thereby to ensure a low center of gravity for the resulting dolly-truck. In still another embodiment, only base 80 is hollow and structure 90 is solid. Although in the above-described embodiments, two clips have been illustrated, a single clip can be used in other embodiments of the dolly-truck. Such a single clip can be formed, for example, by welding together two or more clips 38–39 (FIG. 6D), thereby reducing the number of parts required to form the dolly-truck. Persons skilled in the art can use the above discussed embodiments as a basis for the necessary elements to be cohesively implemented to provide a durable, washable and stable embodiment of a dolly-truck. Therefore, various modifications and adaptations of the above discussed embodiments are encompassed by this invention as set forth in the appended claims.

We claim:

1. An apparatus for transporting an object comprising:
   a single piece integrally formed body comprising a substantially circular base, a plurality of caster wheel supports connected to said base, and a plurality of truck wheel supports connected to and extending forward from said base;
   a plurality of caster wheels supported by said plurality of caster wheel supports, each caster wheel support supporting a caster wheel in a substantially coplanar relationship to other caster wheels of said plurality of caster wheels; and
   a plurality of truck wheels supported by said plurality of truck wheel supports such that said truck wheels have clearance from a ground surface when said plurality of caster wheels are in contact with said ground surface;
   whereby said apparatus is capable of motion in an upright position or a tilted position, such that a tilt angle between said upright position and said tilted position is sufficiently small to allow said apparatus to be moved by a user who is standing or moving in an upright position and, said apparatus can move in the upright position with only said plurality of caster wheels in contact with said ground surface, said plurality of caster wheels permitting omnidirectional movement of said apparatus in said upright position, and said apparatus can move in said tilted position with at least said truck wheels in contact with said ground surface.

2. The apparatus of claim 1, wherein the plurality of caster wheel supports are arranged at substantially equally spaced positions on a periphery of the base.

3. The apparatus of claim 2 wherein the plurality of caster wheel supports are integrally connected to the periphery of the base.

4. The apparatus of claim 1, wherein the body has an upper surface, the apparatus further comprising a retaining structure coupled to the upper surface, the retaining structure being capable of retaining the object on the apparatus when the apparatus is moved.

5. The apparatus of claim 4 further comprising:
   at least one extension tube integrally formed in the retaining structure, the extension tube defining a longitudinal hole sufficient to accept an arm of a handle used to move the apparatus.

6. The apparatus of claim 1 further comprising:
   a handle rigidly connected to and extending forward and upward from the body, the handle having a sufficient length for gripping by a user.

7. The apparatus of claim 6, wherein the handle is connected to the base by at least one knob mounted in a hole of the body, the knob allowing the length of the handle to be adjusted.

8. The apparatus of claim 1 wherein the plurality of truck wheel supports are formed adjacent to and integrally connected to a pair of the caster wheel supports.

9. The apparatus of claim 8 wherein at least one caster wheel of the plurality of caster wheels is a locking caster wheel comprising means for locking, the locking caster wheel when locked causing the apparatus to remain stationary on a tilted surface.

10. The apparatus of claim 9 wherein at least one caster wheel of the plurality of caster wheels comprises a shield.

11. The apparatus of claim 1 further comprising:
    a retaining wall formed integral with the base, the retaining wall having an inner surface conforming to a curvature of the object.

12. The apparatus of claim 11 wherein the body has a ring mounted on a periphery of the base so that a portion of the base between the ring and the retaining wall forms a spill surface.

13. The apparatus of claim 12, wherein the spill surface has a width sufficient to hold a hand tool, and the ring has a height larger than a thickness of the hand tool.

14. The apparatus of claim 12 wherein the caster wheel supports are placed adjacent to and integrally connected with the ring.

15. The apparatus of claim 11 wherein the retaining wall has a lower end in contact with the base, and an upper end opposite to the lower end, the apparatus further comprising a ring mounted at the upper end of the retaining wall.

16. The apparatus of claim 11 wherein the retaining wall is semicircular.

17. The apparatus of claim 16 wherein the ring comprises a first member rigidly attached to the retaining wall, and a second member mounted movable with respect to the retaining wall.

18. The apparatus of claim 17, wherein the second member pivots with respect to the retaining wall to allow a user to move an object into the center of the retaining wall.

19. The apparatus of claim 17, wherein the second member slides with respect to the retaining wall to allow a user to move an object into the center of the retaining wall.

20. The apparatus of claim 11 further comprising:
    a plurality of knobs supported by the retaining wall, the knobs being capable of firmly securing the object to the apparatus.

21. The apparatus of claim 11 wherein the retaining wall has an extension tube, the extension tube supporting a handle connected to and extending forward and upward from the body, the handle having a length sufficient for gripping by a user.

22. The apparatus of claim 21 further comprising:
    a lid clip, the lid clip being supported by the handle, the lid clip being capable of holding a lid of the object.

23. The apparatus of claim 22 wherein the lid clip is formed of a material sufficiently elastic to allow the lid clip to be bent out of position to hold the lid and to snap back into position when released.

24. The apparatus of claim 22 wherein the lid clip has the shape of letter "S".

25. The apparatus of claim 1 wherein the base is a solid disk.

26. The apparatus of claim 25 wherein the body further comprises a plurality of ribs formed on a lower surface of the base.

27. The apparatus of claim 1 further comprising a retaining structure mounted on the base, and a shelf mounted on the retaining structure, the shelf having a plurality of holes for holding a plurality of tools.

28. The apparatus of claim 27, wherein the shelf is located in a plane substantially parallel to another plane passing through the base, thereby to allow a longitudinal member of a tool passing through the holes of the shelf to rest on the base.

29. The apparatus of claim 1, wherein the base has a hole in the center.

30. The apparatus of claim 1, wherein each of the caster wheel supports is formed as an indentation in a lower surface of the base.

31. The apparatus of claim 1, wherein the base is substantially hollow.

32. The apparatus of claim 1 wherein the single-piece integrally formed body is formed of at least one molding material selected from a group consisting of fiber-glass and plastics.

33. The apparatus of claim 1 comprising:
a retaining wall which has a lower end in contact with the base, and an upper end opposite to the lower end, the upper end being located in a plane inclined with respect to another plane passing through the lower end.

34. The apparatus of claim 33, wherein:
the upper end has a front portion and a rear portion, the rear portion being located farthest from the plane of the lower end, the front portion being located closest to the plane of the lower end; and
the apparatus further includes a handle connected to the rear portion.

35. An apparatus for transporting an object comprising:
a single piece integrally formed body comprising a base, a retaining wall integrally connected to said base and a plurality of truck wheel supports integrally connected to and extending forward from said base;
a plurality of truck wheels supported by said plurality of truck wheel supports;
a handle connected to and extending forward and upward from said body, said handle having a sufficient length for gripping by a user, said handle comprising a handle brace and two handle arms, said handle brace being connected between said handle arms;
a ring integrally formed on a periphery of said base so that a portion of said upper surface between said ring and said retaining wall forms a spill surface; and
at least one extension tube integrally formed in said retaining wall, said extension tube defining a longitudinal hole sufficient to accept one of the two handle arms.

36. The apparatus of claim 35 wherein the single-piece integrally formed body is formed of at least one molding material selected from a group consisting of fiber-glass and plastics.

37. The apparatus of claim 36 further comprising a pair of lid clips attached to the handle brace, each of the lid clips being formed of a material sufficiently elastic to allow the lid clips to be bent out of position and to snap back into position when released.

38. The apparatus of claim 37, wherein each lid clip is formed in the shape of letter "S".

39. The apparatus of claim 35 wherein the spill surface holds at least a portion of contents spilled out of the object transported by the apparatus.

40. The apparatus of claim 35 wherein the spill surface is substantially annular and has a width sufficient to hold a hammer.

41. The apparatus of claim 35 further comprising:
a lid clip supported by the body, the lid clip being formed in the shape of letter "L" with a first leg shorter than a second leg.

42. The apparatus of claim 35 further comprising:
a clip mounted on said handle to allow a pole held by said clip to be supported by said spill surface.

43. The apparatus of claim 35 further comprising a plurality of caster wheel supports arranged at substantially equally spaced positions around a circle on the base.

44. The apparatus of claim 35, wherein the body further comprises a shelf connected to the retaining wall, the shelf being located in a plane parallel to another plane passing through the base, the shelf having a hole capable of holding a longitudinal tool in contact with the base.

45. The apparatus of claim 35, wherein the base has a hole in the center.

46. The apparatus of claim 35, wherein the base is substantially hollow.

47. The apparatus of claim 35, wherein the base is substantially solid.

48. The apparatus of claim 35 wherein:
the retaining wall has a lower end in contact with the base, and an upper end opposite to the lower end, the upper end being located in a plane inclined with respect to another plane passing through the lower end.

49. The apparatus of claim 48, wherein:
the upper end has a front portion and a rear portion, the rear portion being located farthest from the plane of the lower end, the front portion being located closest to the plane of the lower end, the handle being connected to said body at the rear portion.

50. An apparatus for transporting an object in either an upright position or a tilted position, the apparatus comprising:
a platform having an upper surface, and a lower surface opposite to the upper surface;
a retaining structure physically attached to the upper surface of the platform, the retaining structure being capable of holding an object in the apparatus during movement of the apparatus;
a wall located at the periphery of the platform, a portion of the platform between the wall and the retaining structure forming a spill surface capable of holding contents spilled from the object;
a plurality of caster wheels coupled to the lower surface of the platform, each of the caster wheels being omni-directionally rollable, the caster wheels being in contact with the ground surface when the apparatus is in the upright position, the caster wheels providing rolling movement to the platform along a ground surface; and
a plurality of truck wheels located adjacent to a periphery of the platform and supported by one of (a) the wall or (b) the platform, the truck wheels being bidirectionally rollable, the truck wheels being in contact with the ground surface when the apparatus is in the tilted position, the truck wheels providing rolling movement to the platform in the tilted position.

51. The apparatus of claim 50, wherein the platform has a hole, and the apparatus further comprises an annular lip formed in the retaining structure and surrounding the hole, the annular lip supporting the object when the object is placed in the apparatus.

52. The apparatus of claim 50, wherein the apparatus has only caster wheels in contact with the ground surface when the apparatus is in the upright position.

53. The apparatus of claim 50 further comprising a handle rigidly connected to and extending forward and upward from the retaining structure.

54. The apparatus of claim 50, wherein the retaining structure is formed separate and distinct from the platform, and the apparatus further comprises:

a plurality of fasteners, the retaining structure and the platform being physically attached to each other by said fasteners.

55. The apparatus of claim 50, further comprising:

a clip supported by the retaining structure, the clip being formed of a material sufficiently elastic to allow the clip to be bent out of position and to snap back into position when released, the clip being capable of retaining a lid of the object between the clip and the retaining structure.

56. The apparatus of claim 55 wherein the retaining wall has a first height adjacent to the truck wheels and a second height smaller than the first height diametrically opposite to the truck wheels.

57. The apparatus of claim 55 wherein the clip has the shape of letter "S".

58. The apparatus of claim 55 wherein the clip has the shape of letter "L".

59. The apparatus of claim 50, wherein the spill surface has a substantially annular shape with a width sufficient to hold a brush.

60. The apparatus of claim 50 further comprising:

a shelf mounted at a top end of the retaining structure, the shelf having a plurality of holes for supporting a plurality of tools on the spill surface.

61. The apparatus of claim 50, wherein the platform has sufficient strength to transfer the weight of the object and the weight of a person seated on the object from the retaining structure to the caster wheels or to the truck wheels.

62. The apparatus of claim 50 wherein the retaining structure has an opening larger than a dimension of the object, thereby to allow a user to move the object through the opening into the center of the retaining structure.

63. The apparatus of claim 62 wherein the retaining structure further comprises a member for closing at least a part of the opening.

64. The apparatus of claim 63, wherein the member is mounted pivotable with respect to the retaining structure.

65. The apparatus of claim 50 wherein:

the retaining structure has a lower end in contact with the base, and an upper end opposite to the lower end, the upper end being located in a plane inclined with respect to another plane passing through the lower end.

66. The apparatus of claim 65, wherein:

the upper end has a front portion and a rear portion, the rear portion being located farthest from the plane of the lower end, the front portion being located closest to the plane of the lower end; and the apparatus further includes a handle connected to the rear portion.

67. The apparatus of claim 50, wherein the object is an open bucket having contents, and wherein the spill surface has a width sufficient to hold at least a portion of contents spilled out of the open bucket.

68. The apparatus of claim 50 wherein at least one caster wheel of the plurality of caster wheels is capable of being locked.

69. The apparatus of claim 50 wherein the spill surface is substantially annular, and has a width sufficient to hold a brush.

70. An apparatus for transporting an object in either an upright position or a tilted position, the apparatus comprising:

a platform having an upper surface, and a lower surface opposite to the upper surface;

a retaining structure physically attached to the upper surface of the platform, the retaining structure being capable of holding an object in the apparatus during movement of the apparatus;

a wall located at the periphery of the platform, a portion of the platform between the wall and the retaining structure forming a spill surface capable of holding contents spilled from the object;

a plurality of caster wheels coupled to the lower surface of the platform, each of the caster wheels being omni-directionally rollable, the caster wheels being in contact with the ground surface when the apparatus is in the upright position, the caster wheels providing rolling movement to the platform along a ground surface; and a plurality of truck wheels located adjacent to a periphery of the platform and supported by one of (a) the wall or (b) the platform, the truck wheels being bidirectionally rollable, the truck wheels being in contact with the ground surface when the apparatus is in the tilted position, the truck wheels providing rolling movement to the platform in the tilted position;

wherein the retaining structure has an opening larger than a dimension of the object, thereby to allow a user to move the object through the opening into the center of the retaining structure;

wherein the retaining structure further comprises a member for closing at least a part of the opening; and wherein the member slides with respect to the retaining structure.

* * * * *